United States Patent
Yanai et al.

(10) Patent No.: US 10,795,254 B2
(45) Date of Patent: Oct. 6, 2020

(54) TRANSPARENT SCREEN

(71) Applicant: FUJIFILM Corporation, Tokyo (JP)

(72) Inventors: Yujiro Yanai, Minami-ashigara (JP); Akira Yamamoto, Minami-ashigara (JP); Michio Nagai, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 88 days.

(21) Appl. No.: 16/015,513

(22) Filed: Jun. 22, 2018

(65) Prior Publication Data

US 2018/0321577 A1 Nov. 8, 2018

Related U.S. Application Data

(63) Continuation of application No. PCT/JP2016/087271, filed on Dec. 14, 2016.

(30) Foreign Application Priority Data

Dec. 25, 2015 (JP) .................. 2015-253937

(51) Int. Cl.
*G03B 21/62* (2014.01)
*G03B 21/60* (2014.01)
(Continued)

(52) U.S. Cl.
CPC ........... *G03B 21/60* (2013.01); *G03B 21/604* (2013.01); *G03B 21/62* (2013.01);
(Continued)

(58) Field of Classification Search
None
See application file for complete search history.

(56) References Cited

U.S. PATENT DOCUMENTS

| 5,317,405 A * | 5/1994 | Kuriki | H04N 7/144 348/14.16 |
| 2005/0068620 A1* | 3/2005 | Umeya | G03B 21/602 359/459 |

(Continued)

FOREIGN PATENT DOCUMENTS

| JP | 2005-3823 A | 1/2005 |
| JP | 2005-165271 A | 6/2005 |

(Continued)

OTHER PUBLICATIONS

Kashiwagi, English language translation of JP2015060193A (Year: 2015).*

(Continued)

*Primary Examiner* — Jessica M Merlin
*Assistant Examiner* — Mark D Teets
(74) *Attorney, Agent, or Firm* — Birch, Stewart, Kolasch & Birch, LLP

(57) ABSTRACT

According to the present invention, there is provided a plurality of protruding portions that are formed on one surface of the support and have inclined surfaces parallel to each other; a cholesteric liquid crystal layer that is formed on each of the inclined surfaces of the protruding portions; and an overcoat layer that is laminated on the surface of the support on which the protruding portions are formed so as to cover the cholesteric liquid crystal layer, in which a normal line of each of the inclined surfaces of the protruding portions is parallel to a spiral axis of the cholesteric structure of the cholesteric liquid crystal layer, an angle formed between a normal line of a surface of the overcoat layer and the spiral axis of the cholesteric structure is 5° to 42°, a difference in refractive index between the cholesteric liquid crystal layer and the protruding portion and a difference in (Continued)

refractive index between the cholesteric liquid crystal layer and the overcoat layer are 0.2 or less.

8 Claims, 5 Drawing Sheets

(51) Int. Cl.
  *G03B 21/604* (2014.01)
  *G02F 1/1335* (2006.01)
  *G03B 21/28* (2006.01)
(52) U.S. Cl.
  CPC ............ *G02F 2001/133543* (2013.01); *G02F 2201/343* (2013.01); *G03B 21/28* (2013.01)

(56) References Cited

U.S. PATENT DOCUMENTS

| | | | | |
|---|---|---|---|---|
| 2005/0122582 | A1* | 6/2005 | Umeya | G03B 21/567 359/449 |
| 2006/0238679 | A1* | 10/2006 | Hirai | G02F 1/133528 349/117 |
| 2018/0039013 | A1* | 2/2018 | Yanai | G02B 5/3025 |

FOREIGN PATENT DOCUMENTS

| | | |
|---|---|---|
| JP | 2006-284862 A | 10/2006 |
| JP | 2006-309017 A | 11/2006 |
| JP | 2006-337944 A | 12/2006 |
| JP | 2007-178624 A | 7/2007 |
| JP | 2014-119605 A | 6/2014 |
| JP | 2015-60193 A | 3/2015 |
| JP | 2005-146003 A | 8/2015 |
| JP | 2015-524079 A | 8/2015 |

OTHER PUBLICATIONS

Umetani, English language translation of JP2005165271A (Year: 2005).*

International Preliminary Report on Patentability and English translation of Written Opinion of the International Searching Authority, issued in PCT/JP2016/087271, dated Jun. 26, 2018 (Forms in PCT/IB/373 and PCT/ISA/237).

Japanese Office Action, dated Aug. 6, 2019, for corresponding Japanese Application No. 2017-558065, with English translation.

Japanese Office Action, dated May 21, 2019, for corresponding Japanese Application No. 2017-558065, with an English machine translation.

* cited by examiner

TRANSPARENT SCREEN

CROSS-REFERENCE TO RELATED APPLICATIONS

This application is a Continuation of PCT International Application No. PCT/JP2016/087271 filed on Dec. 14, 2016, which claims priority under 35 U.S.C. § 119(a) to Japanese Patent Application No. 2015-253937 filed on Dec. 25, 2015. The above application is hereby expressly incorporated by reference, in its entirety, into the present application.

BACKGROUND OF THE INVENTION

1. Field of the Invention

The present invention relates to a transparent screen.

2. Description of the Related Art

In recent years, transparent screens in which light from the front surface side is reflected and light from the back surface side is transmitted, have been proposed as one of display devices.

For example, JP2006-337944A describes a semi-transmissive type reflective screen including a base material layer that is capable of transmitting light and is formed into an approximately flat parallel plate; a plurality of unit shapes capable of transmitting light, which protrudes on the back surface side of the base material layer, which is an opposite side of the video source side, and are one-dimensionally or two-dimensionally arranged in a row along a screen surface; and a reflective layer that is provided at the apex of the back surface side of the unit shapes and reflects the video light that has been transmitted through the unit shapes, in which the unit shapes are arranged with gaps therebetween, and in the space between the unit shapes are arranged, a background transmission unit is provided in a state where the base material layer or a flat surface parallel to the base material layer is exposed. This semi-transmissive type reflective screen is a screen with which the background on the back surface side can be observed from the front, while the video light from the front is reflected by means of a reflective surface and is made observable.

In addition, JP2006-284862A discloses using of a reflective element that is formed of a cholesteric liquid crystal having a function of reflecting light of a specific polarization component, as a reflective element in a general projection screen.

Meanwhile, in the projection screen and the transparent screen, in a case where video light is projected on a projection surface of the projection screen from behind a viewer, that is, in a case where video light is incident on the projection screen from a front, the light is reflected on an outermost surface (light source is reflected), and reflection intensity in the front direction becomes excessively high. Therefore, the viewer may see glare.

On the other hand, it is considered that the reflected glare of the light source is prevented from being seen by the viewer by making emission angles of the reflected light of the video light reflected by the projection screen and the reflected light of the outermost surface different from each other.

For example, JP2006-284862A discloses that it is possible to obtain an anisotropic optical characteristic with respect to a normal direction of a surface of the element by aligning an average of spiral axis directions of a liquid crystal domain of a cholesteric liquid crystal layer so as to be in a state of being inclined with respect to a normal direction of the surface of the cholesteric liquid crystal layer, and that the reflected glare of the light source can be prevented from being seen by the viewer by making emission angles of the reflected light of the video light and the reflected light of the outermost surface different from each other.

SUMMARY OF THE INVENTION

However, in the projection screen disclosed in JP2006-284862A, it is disclosed that the spiral axis direction of the liquid crystal domain of the cholesteric liquid crystal layer varies and thus the reflected light of the video light is scattered.

Therefore, there was a problem that the reflection intensity of the video light cannot be increased in a specific direction. In addition, low transparency because of light from the background being scattered, was also a problem.

An object of the present invention is to solve such problems of the related art and is to provide a transparent screen that reflects light from a front surface side and transmits light from a back surface side, in which the reflected glare of the light source is prevented from being seen by the viewer by making emission angles of the reflected light of the video light and the reflected light of the outermost surface different from each other, and in which reflection intensity of the video light can be increased and transparency can be increased.

As a result of intensive studies on the problems of the related art, the inventors of the present invention have found that the above problems can be solved by the following aspects in which a support capable of transmitting light; a plurality of protruding portions that are formed on one surface of the support and have inclined surfaces parallel to each other; a cholesteric liquid crystal layer that is formed on each of the inclined surfaces of the plurality of protruding portions and formed of a liquid crystal material having a cholesteric structure; and an overcoat layer that is laminated on the surface of the support, on which the plurality of protruding portions are formed, so as to cover the cholesteric liquid crystal layer, are provided, in which a normal line of each of the inclined surfaces of the plurality of protruding portions is parallel to a spiral axis of the cholesteric structure of the cholesteric liquid crystal layer, an angle formed between a normal line of a surface of the overcoat layer and the spiral axis of the cholesteric structure of the cholesteric liquid crystal layer is 5° to 42°, a difference in refractive index between the cholesteric liquid crystal layer and the protruding portion is 0.2 or less, and a difference in refractive index between the cholesteric liquid crystal layer and the overcoat layer is 0.2 or less.

That is, the inventors have found that the above object can be achieved by the following configuration.

(1) A transparent screen comprising: a support that is capable of transmitting light; a plurality of protruding portions that are formed on one surface of the support and have inclined surfaces parallel to each other; a cholesteric liquid crystal layer that is formed on each of the inclined surfaces of the plurality of protruding portions and formed of a liquid crystal material having a cholesteric structure; and an overcoat layer that is laminated on the surface of the support, on which the plurality of protruding portions are formed, so as to cover the cholesteric liquid crystal layer, in which a normal line of each of the inclined surfaces of the plurality of protruding portions is parallel to a spiral axis of the cholesteric structure of the cholesteric liquid crystal layer, an angle formed between a normal line of a surface of the overcoat layer and the spiral axis of the cholesteric structure of the cholesteric liquid crystal layer is 5° to 42°, a difference in refractive index between the cholesteric liquid crystal layer and the protruding portion is 0.2 or less, and a difference in refractive index between the cholesteric liquid crystal layer and the overcoat layer is 0.2 or less.

(2) The transparent screen according to (1), in which an angle of the spiral axis of the cholesteric structure of the cholesteric liquid crystal layer with respect to the surface of the overcoat layer is 15° to 25°.

(3) The transparent screen according to (1) or (2), in which the difference in refractive index between the cholesteric liquid crystal layer and the protruding portion is 0.05 or less, and the difference in refractive index between the cholesteric liquid crystal layer and the overcoat layer is 0.05 or less.

(4) The transparent screen according to any one of (1) to (3), in which the cholesteric liquid crystal layer is formed of two or more layers reflecting light of different wavelength regions.

(5) The transparent screen according to any one of (1) to (4), in which in a cross section perpendicular to the surface of the overcoat layer and parallel to an inclination direction of the inclined surface of the plurality of protruding portions, a shape of the protruding portion is an obtuse-angled triangle, and an apex of the obtuse angle is formed on the surface side of the overcoat layer.

(6) A transparent screen that is formed by laminating two or more of the transparent screens according to any one of (1) to (5), in which cholesteric liquid crystal layers of the respective transparent screens reflect light of different wavelength regions.

According to the present invention, it is possible to provide a transparent screen in which the reflected glare of the light source is prevented from being seen by the viewer by making emission angles of the reflected light of the video light and the reflected light of the outermost surface different from each other, and in which reflection intensity of the video light can be increased.

DESCRIPTION OF THE PREFERRED EMBODIMENTS

Figure 1:
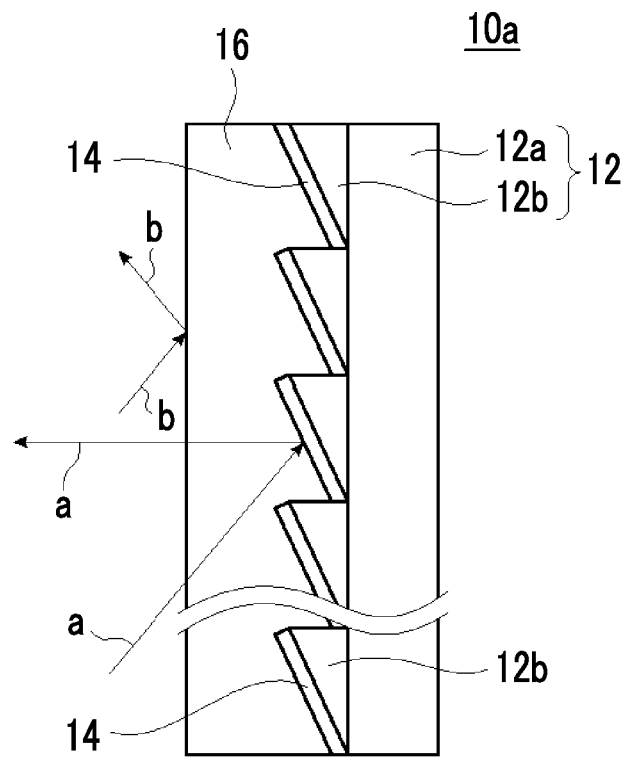
FIG. 1 is a diagram conceptually showing an example of a transparent screen of the present invention.

Hereinafter, a transparent screen of the present invention will be described in detail based on preferred examples shown in the attached drawings.

A numerical value range represented by using "to" in the present specification means a range including the numerical values described before and after "to" as the lower limit and the upper limit, respectively.

According to the present specification, for example, an angle such as "45°", "parallel", "perpendicular" or "orthogonal" means that unless particularly stated otherwise, the difference between the angle and the exact angle is in the range of smaller than 5 degrees. The difference between the angle and the exact angle is preferably smaller than 4 degrees, and more preferably smaller than 3 degrees.

According to the present specification, the term "(meth) acrylate" is used to mean "any one or both of acrylate and methacrylate".

According to the present specification, the term "same" is meant to include an error range that is generally tolerable in the technical field. According to the present specification, in a case where it is said "entirety", "all" or "entire surface", the terms are meant to include error ranges that are generally tolerable in the technical field, in addition to the case of being 100%, and to include the cases of, for example, 99% or more, 95% or more, or 90% or more.

Visible light is light having wavelengths that can be seen by human eyes among the electromagnetic waves and indicates light in the wavelength region of 380 nm to 780 nm. Non-visible light is light in the wavelength region of shorter than 380 nm or in the wavelength region of longer than 780 nm.

Without being limited to this, light in the wavelength region of 420 nm to 495 nm in the visible light is blue light, light in the wavelength region of 495 nm to 570 nm is green light, and light in the wavelength region of 620 nm to 750 nm is red light.

In the infrared light, near-infrared light is an electromagnetic wave in the wavelength region of 780 nm to 2,500 nm. Ultraviolet light is light in the wavelength region of 10 to 380 nm.

According to the present specification, the term "haze" means a value measured using a haze meter, NDH-2000, manufactured by Nippon Denshoku Industries Co., Ltd.

Theoretically, the haze means a value represented by the following expression.

(Scattering transmittance of natural light at 380 to 780 nm)/(scattering transmittance of natural light at 380 to 780 nm+direct transmittance of natural light)×100%

The scattering transmittance is a value that can be calculated by subtracting the direct transmittance from the omnidirectional transmittance obtainable by using a spectrophotometer and an integrating sphere unit. The direct transmittance in the case based on the value measured using an integrating sphere unit is transmittance at 0°. That is, a low haze means that an amount of directly transmitted light is large among a total amount of transmitted light.

A refractive index is a refractive index with respect to light having a wavelength of 589.3 nm.

A transparent screen of the present invention includes: a support capable of transmitting light; a plurality of protruding portions that are formed on one surface of the support and have inclined surfaces parallel to each other; a cholesteric liquid crystal layer that is formed on each of the inclined surfaces of the plurality of protruding portions and formed of a liquid crystal material having a cholesteric structure; and an overcoat layer that is laminated on the surface of the support on which the plurality of protruding portions are formed so as to cover the cholesteric liquid crystal layer, in which a normal line of each of the inclined surfaces of the plurality of protruding portions is parallel to a spiral axis of the cholesteric structure of the cholesteric liquid crystal layer, an angle formed between a normal line of a surface of the overcoat layer and the spiral axis of the cholesteric structure of the cholesteric liquid crystal layer is 5° to 42°, a difference in refractive index between the cholesteric liquid crystal layer and the protruding portion is 0.2 or less, and a difference in refractive index between the cholesteric liquid crystal layer and the overcoat layer is 0.2 or less.

FIG. 1 conceptually shows an example of a transparent screen of the present invention.

The diagrams presented for the present invention are schematic diagrams, and the relations of the thicknesses of various layers, the positional relations, and the like do not necessarily coincide with the actual relations. The same also applies to the following diagrams.

A transparent screen 10a shown in FIG. 1 includes a support 12 having a plurality of protruding portion 12b; a cholesteric liquid crystal layer 14 formed on an inclined surface of a protruding portion 12b; and an overcoat layer 16 that is laminated on each of the plurality of protruding portions 12b sides of the support 12 so as to cover the cholesteric liquid crystal layer 14.

In addition, video light is incident on a surface on the side where the cholesteric liquid crystal layer 14 is formed. That is, the surface on the side where the cholesteric liquid crystal layer 14 is formed is a front surface, and a surface on the opposite side is a back surface.

Figure 2:
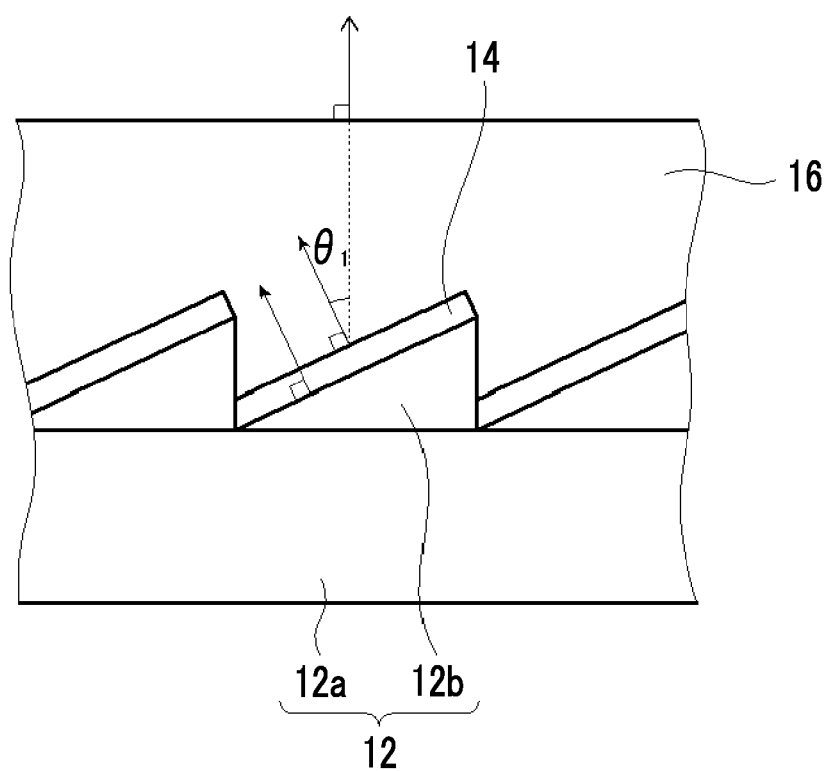
FIG. 2 is an enlarged view of a part of the transparent screen shown in FIG. 1.

In the present invention, the cholesteric liquid crystal layer 14 is formed on the inclined surface of the protruding portion 12b, an angle (refer to FIG. 2, hereinafter will also be referred to as "spiral axis angle $\theta_1$") formed between a normal line of a surface of the overcoat layer 16 (surface of the transparent screen 10a) and a spiral axis of a cholesteric structure of the cholesteric liquid crystal layer 14 is 5° to 42°, and a difference in refractive index between the cholesteric liquid crystal layer 14 and the protruding portion 12b is 0.2 or less and a difference in refractive index between the cholesteric liquid crystal layer 14 and the overcoat layer 16 is 0.2 or less.

Based on the above description, as shown by arrow a's of FIG. 1, among light which is incident on the transparent screen 10a from an oblique direction, light which has reached the cholesteric liquid crystal layer 14 is specularly reflected from the cholesteric liquid crystal layer 14 and is emitted into a front direction of the transparent screen 10a. On the other hand, as shown by arrow b's, light reflected from the surface (transparent screen 10a) of the overcoat layer 16 is specularly reflected from the surface of the overcoat layer 16 and is emitted into an oblique direction (the upper left direction in FIG. 1). That is, a reflection direction of the light reflected from the cholesteric liquid crystal layer 14 and the light reflected from the surface of the overcoat layer 16 can be made different, and thus it is possible to prevent reflected glare of a light source from being seen by a viewer.

In addition, since the light is emitted into the front direction of the transparent screen 10a by the specular reflection from the cholesteric liquid crystal layer 14, reflection intensity of video light in a front can be increased.

Examples of a system for incidence of light from an oblique direction with respect to the transparent screen include a system by which video light is projected by a large projection angle (perpendicular line of a main surface of the transparent screen is set to 0°) from an oblique direction with respect to the transparent screen by using a so-called short focus projector as a video source. By projecting the video light on the transparent screen of the present invention using the short focus projector, the reflected light of the video light is reflected into the front direction of the transparent screen and thus the reflected light from an outermost surface can be reflected into a direction other than the front direction, and reflected glare of the light source can be prevented from being seen by the viewer and thus reflection intensity of the video light on the front can be increased.

[Support]

It is preferable that the support 12 is capable of transmitting light, that is, the support 12 has a low light reflectance at a wavelength at which the cholesteric liquid crystal layer reflects light, and it is preferable that the support 12 does not include a material that reflects light at a wavelength at which the cholesteric liquid crystal layer reflects light.

It is also preferable that the support 12 is transparent in a visible light region. In addition, the support 12 may be colored, but it is preferable that the support 12 is not colored or is colored to a low extent.

The support 12 has a flat sheet-shaped substrate 12a and the plurality of protruding portions 12b formed on one main surface of the substrate 12a.

In the illustrated example, the protruding portion 12b has a cross section of a right-angled triangle and is formed with a surface adjacent to the right angle being on a surface side of the substrate 12a. In addition, in the protruding portion 12b, a surface not adjacent to the right angle is an inclined surface inclined by a predetermined angle with respect to the main surface of the substrate 12a.

As shown in the drawing, inclined surfaces of each of the protruding portions 12b are parallel to each other.

In addition, in the illustrated example, the protruding portion 12b is densely arranged without gaps in a longitudinal direction (vertical direction in FIG. 1) of the substrate 12a.

On the inclined surface of each of the protruding portions 12b, the cholesteric liquid crystal layer 14 to be described later is formed. By forming the cholesteric liquid crystal layer on the inclined surface inclined at a predetermined angle, an angle $\theta_1$ (spiral axis angle $\theta_1$) formed between a spiral axis of the cholesteric structure of the cholesteric liquid crystal layer 14 and a normal line of the surface of the transparent screen 10a (the surface of the overcoat layer 16) can be 5° to 42°.

The plurality of protruding portions 12b may have an elongated shape extending in a width direction (direction perpendicular to a paper plane in FIG. 1), or the plurality of protruding portions 12b may be arranged in the width direction.

In addition, a size of the protruding portion 12b is not limited to, for example, a length of the side in contact with the substrate 12a in the cross-sectional shape of the protruding portion 12b (hereinafter will be referred to as "length of the protruding portion 12b"), a height from the surface of the substrate 12a (hereinafter will be referred to as "height of the protruding portion 12b"), and the like, but from the viewpoints of difficulty in visual recognition of the protruding portion, ease of arrangement of the cholesteric liquid crystal, prevention of rainbow unevenness due to influence of diffraction, and the like, a length of the protruding portion 12b is preferably 15 μm to 300 μm, and more preferably 30 μm to 100 μm. In addition, a height of the protruding portion 12b is preferably 1 μm to 270 μm, and more preferably 9 μm to 90 μm.

In addition, in regard to an inclination angle of the inclined surface of the protruding portion 12b with respect to the main surface of the substrate 12a, an angle formed between the normal line of the surface of the overcoat layer to be described later and the spiral axis of the cholesteric structure of the cholesteric liquid crystal layer is 5° to 42°. That is, the inclination angle of the inclined surface is preferably 5° to 42°, more preferably 10° to 25°, and still more preferably 15° to 20°.

In addition, a difference in refractive index between the protruding portion 12b and the cholesteric liquid crystal layer 14 is 0.2 or less, preferably 0.05 or less, and more preferably 0.02 or less.

With a difference in refractive index between the protruding portion 12b and the cholesteric liquid crystal layer 14 being 0.2 or less, light reflecting from an interface between the protruding portion 12b (support 12) and the cholesteric liquid crystal layer 14 is prevented, and thus transparency can be increased.

In addition, a thickness of the substrate 12a (thickness excluding a thickness of the protruding portion 12b) may be selected according to the applications and is not particularly limited, but the thickness thereof may be about 5 μm to 1,000 μm, preferably 10 μm to 250 μm, and more preferably 15 μm to 150 μm.

In addition, a difference in refractive index between the substrate 12a and the cholesteric liquid crystal layer 14 is preferably 0.2 or less, more preferably 0.05 or less, and particularly preferably 0.02 or less.

With a difference in refractive index between the substrate 12a and the cholesteric liquid crystal layer 14 being 0.2 or less, light reflecting from an interface between the substrate 12a (support 12) and the cholesteric liquid crystal layer 14 is prevented, and thus transparency can be increased.

In addition, in regard to the transparent screen 10a shown in FIG. 1, a configuration in which the plurality of protruding portions 12b each having an inclined surface inclined with respect to the main surface of the substrate 12a are arranged on the surface of the planar substrate 12a, is adopted, but is not limited thereto.

Figure 3:
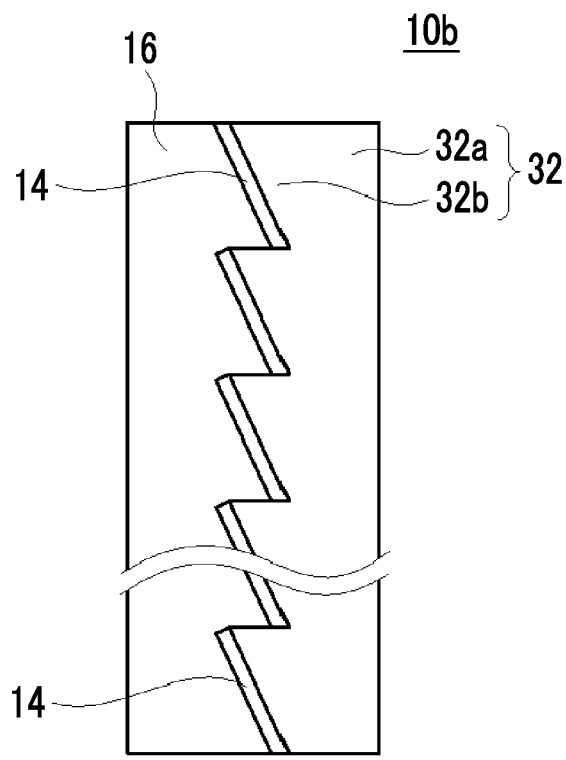
FIG. 3 is a diagram conceptually showing another example of the transparent screen of the present invention.

For example, as a transparent screen 10b shown in FIG. 3, a configuration of using a support 32 in which the substrate portion 32a and a protruding portion 32b are integrally formed, may be adopted.

In the transparent screen 10b shown in FIG. 3, the same parts as those of the transparent screen 10a shown in FIG. 1 are denoted by the same reference numerals, and a detailed description thereof will be omitted. This point also applies to the following drawings.

Figure 4:
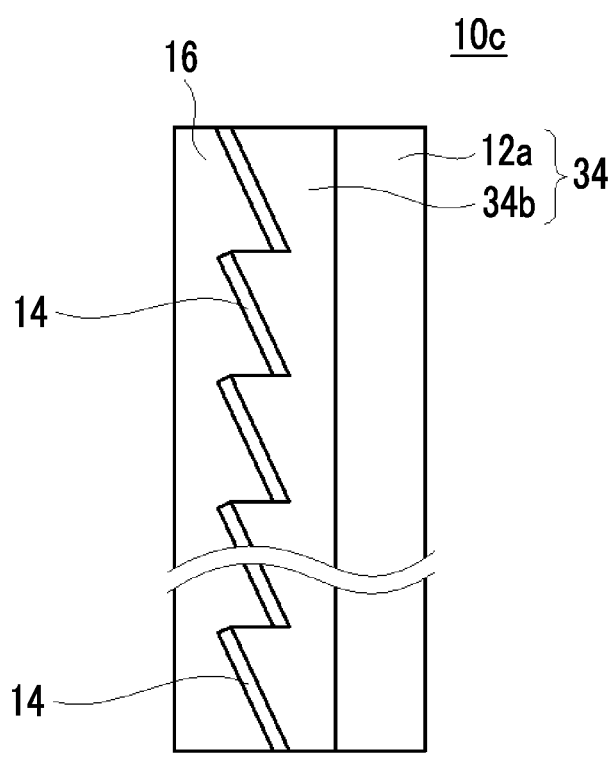
FIG. 4 is a diagram conceptually showing still another example of the transparent screen of the present invention.

Alternatively, as in a transparent screen 10c shown in FIG. 4, a configuration of using a support 34 having a protruding portion-forming layer 34b in which a plurality of protruding portions are integrally formed, and the substrate 12a, may be adopted.

Figure 5:
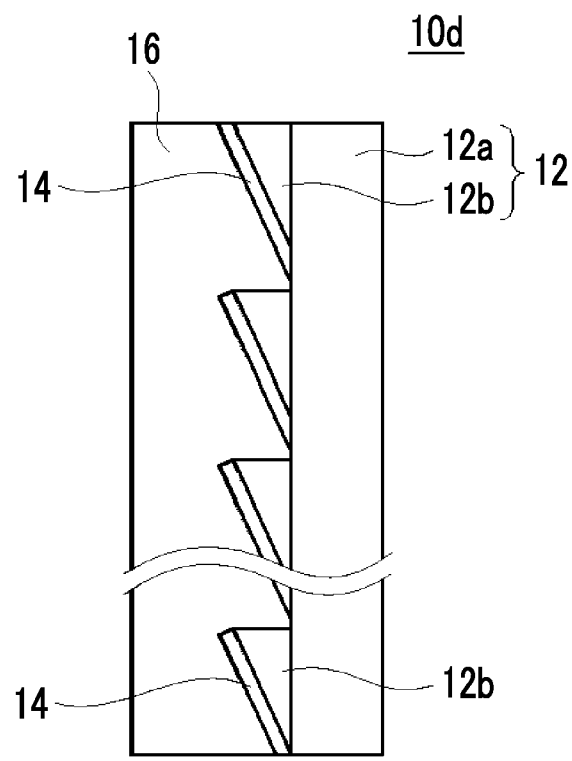
FIG. 5 is a diagram conceptually showing still another example of the transparent screen of the present invention.

In addition, in the example shown in FIG. 1, the configuration in which the plurality of protruding portions 12b are densely arranged without gaps in the longitudinal direction of the substrate 12a, is adopted but not limited thereto, and as a transparent screen 10d shown in FIG. 5, as a configuration for discretely arranging the plurality of protruding portions 12b, gaps may be provided between the adjacent protruding portions 12b.

In a case where the protruding portion 12b is densely arranged, the reflection intensity of the video light can be further increased. On the other hand, in a case where the gaps are provided between the protruding portions 12b, the transparency can be further improved.

A size of the gap in a case where the plurality of protruding portions 12b are arranged with the gap therebetween, is not limited, but in a case where the cross-sectional shape of the protruding portion 12b is a right-angled triangle, a length of the gap is preferably about L×tan α×tan 2α or more, and a length of the gap is more preferably 0.9×L× tan α×tan 2α or more and 1.1∴L×tan α×tan 2α or less. The symbol L is a length of the side in contact with the substrate 12a in right-angled triangle of the cross-sectional shape of the protruding portion 12b, that is, a length of the protruding portion 12b, and the symbol α is an angle at the apex of an acute angle in contact with the substrate 12a.

By setting a length of the gap between the protruding portions 12b within this range, in a case where light is incident from the oblique direction with respect to the transparent screen, the cholesteric liquid crystal layer 14 formed on the inclined surface of the protruding portion 12b can be efficiently used.

In addition, in the example shown in FIG. 1, the configuration in which the protruding portion 12b has the cross section of a right-angled triangle and is formed with the surface adjacent to the right angle being on the surface side of the substrate 12a, is adopted but not limited thereto, as long as the protruding portion has an inclined surface with which a spiral axis angle $\theta_1$ can be 5° to 42°.

Figure 6:
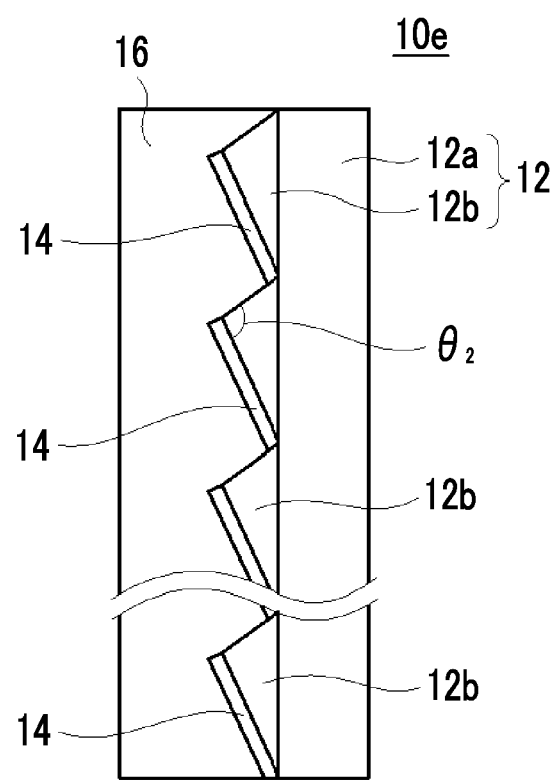
FIG. 6 is a diagram conceptually showing still another example of the transparent screen of the present invention.

As an example, in a transparent screen 10e shown in FIG. 6, in the cross section parallel to the inclination direction of the inclined surface of the plurality of protruding portions 12b, the shape of the protruding portion 12b is an obtuse-angled triangle, and an apex of the obtuse angle is disposed on the surface side of the overcoat layer, that is, on the side opposite to the substrate 12a.

As an angle $\theta_2$ of the obtuse angle, an angle of about 90°+α is preferable, (85°+α) or more and (95°+α) or less is more preferable.

Based on the above description, in a case where light is incident from the oblique direction with respect to the transparent screen, the cholesteric liquid crystal layer 14 formed on the inclined surface of the protruding portion 12b can be efficiently used.

In the example shown in FIG. 6, a configuration in which the cholesteric liquid crystal layer 14 is disposed on one inclined surface of the protruding portion 12b having an obtuse-angled triangle shape, is adopted but is not limited thereto, and a configuration in which the cholesteric liquid crystal layer 14 is disposed on both inclined surfaces may be adopted.

By using the configuration in which the shape of the protruding portion has two inclined surfaces, and by disposing the cholesteric liquid crystal layer 14 on both inclined surfaces, light can be incident on the transparent screen from a plurality of directions. For example, light which is incident on the transparent screen from an obliquely lower side of the transparent screen can be reflected into the front direction, or light which is incident on the transparent screen from an obliquely upper side of the transparent screen can be reflected into the front direction.

In addition, by making a changing direction of the light reflected from the cholesteric liquid crystal layer formed on both inclined surfaces different, stereoscopic vision (so-called 3D display) can be implemented by displaying images for the left eye or images for the right eye of a viewer for the right-handed circularly polarized light and the left-handed circularly polarized light of video light, respectively.

As described above, the support may be single-layered or may be multilayered, and examples of a material for forming the support 32 in the case of being a single-layered support include glass, triacetyl cellulose (TAC), polyethylene terephthalate (PET), polycarbonate, polyvinyl chloride, acryl, a polyolefin, and the like, but from the viewpoint of maintaining a polarization state of the reflected light, glass, triacetyl cellulose (TAC), acryl, and the like, which have small birefringence are preferable.

As examples of the material for the support in the case of being multilayered support, the examples of the material for forming the support 32 in the case of the above single layer in the case of being a single-layered support can be mentioned as an example of the material for forming the substrate 12a.

In addition, examples of the material for the layer including the protruding portion in the case of being multilayered protruding portion include a resin layer obtained by curing a composition containing a monomer, and the like.

A resin is not particularly limited and may be selected in consideration of adhesiveness to a liquid crystal material with which the substrate 12a and/or the cholesteric liquid crystal layer 14 is formed, or the like. For example, a thermoplastic resin, a thermosetting resin, and an ultraviolet-curable resin can be used. In view of durability, solvent resistance, and the like, a resin of the type that is cured by crosslinking is preferred, and particularly, an ultraviolet-curable resin that can be cured in a short period of time is preferred. Examples of a monomer that can be used as the material for forming the protruding portion 12b include ethyl (meth)acrylate, ethylhexyl (meth)acrylate, styrene, methylstyrene, N-vinylpyrrolidone, polymethylolpropane tri (meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, neopentyl glycol di(meth)acrylate, and the like.

In addition, examples of a method of forming the protruding portion 32b in the case of being a single-layered portion include a forming method by a so-called embossing process of pressing a mold while heating the flat-shaped support so as to mold the support into a shape according to the shape of the mold.

In addition, examples of a method for forming the protruding portion 12b in the case of being the multilayered portion, include a method by a so-called imprinting, in which a resin composition to be the protruding portion 12b is applied to the surface of the flat plate-like substrate 12a, and the resin composition is cured by ultraviolet ray irradiation or the like after being dried while molding with a mold.

Alternatively, the mold may be filled with a resin composition to be the protruding portion 12b, the molded resin composition may be transferred onto the substrate 12a and cured by ultraviolet ray irradiation or the like, and therefore the protruding portion 12b may be formed.

In order to form the cholesteric liquid crystal layer 14 to be described later, the support (protruding portion) preferably has an alignment film on the surface thereof. That is, it is preferable that by using the support having the alignment film on the surface thereof, an application solution is applied to the surface of the alignment film so as to form the cholesteric liquid crystal layer.

The alignment film is preferably formed by a rubbing treatment of a polymer.

Examples of the polymer include methacrylate-based copolymers, styrene-based copolymers, polyolefins, polyvinyl alcohols and modified polyvinyl alcohols, poly(N-methylol acrylamide), polyester, polyimide, vinyl acetate copolymer, carboxymethyl cellulose, polycarbonate, and the like disclosed in paragraph [0022] of JP1996-338913A (JP-H8-338913A). A silane coupling agent can also be used as a polymer. As the polymer, a water-soluble polymer (for example, poly(N-methylolacrylamide), carboxymethyl cellulose, gelatin, polyvinyl alcohol, and modified polyvinyl alcohol) is preferable, and gelatin, polyvinyl alcohol, and modified polyvinyl alcohol are still more preferable, and polyvinyl alcohol and modified polyvinyl alcohol are most preferable.

As the rubbing treatment, a processing method widely adopted as a liquid crystal alignment processing step of a liquid crystal panel used in a liquid crystal display device (LCD) and the like can be applied. That is, it is possible to use a method for obtaining alignment by rubbing the surface of the alignment film in a certain direction using paper, gauze, felt, rubber or nylon, polyester fiber, or the like. In general, the alignment can be realized by carrying out rubbing multiple times using cloth in which fibers having uniform length and thickness are uniformly implanted.

A composition to be the cholesteric liquid crystal layer 14 to be described later is applied to the surface subjected to the rubbing treatment of the alignment film so as to align molecules of a liquid crystal compound. Thereafter, if necessary, the alignment film polymer is allowed to react with a polyfunctional monomer contained in the optically anisotropic layer, or the alignment film polymer is crosslinked using a crosslinking agent, and therefore the cholesteric liquid crystal layer 14 can be formed.

A thickness of the alignment film is preferably within a range of 0.1 to 10 µm.

In addition, in order to align the alignment direction of the cholesteric structure in a case of forming the cholesteric liquid crystal layer 14 to be described later, surface energy of the support (protruding portion) may be adjusted. Examples of a treatment for adjusting the surface energy include a corona treatment.

On the inclined surface of each of the protruding portions 12b of support 12, the cholesteric liquid crystal layer 14 is disposed.

The cholesteric liquid crystal layer 14 is a layer having a uniform thickness and covering the surface of the inclined surface of the protruding portion 12b.

[Cholesteric Liquid Crystal Layer]

The cholesteric liquid crystal layer 14 has wavelength-selective reflectivity. The light for which the cholesteric liquid crystal layer 14 exhibits selective reflectivity is not particularly limited, and for example, the light may be any of infrared light, visible light, ultraviolet light, and the like. For example, in a case in which the transparent screen is used as a screen that displays an image created by video light emitted from a video device such as projector, and the background on the back surface side of the transparent screen in a superimposed manner, it is preferable that the light for which the cholesteric liquid crystal layer 14 exhibits selective reflectivity is visible light.

Alternatively, it is also preferable that the reflection wavelength is selected according to the wavelength of light that is emitted from the light source used in combination.

The cholesteric liquid crystal layer 14 is formed of a liquid crystal material having a cholesteric structure. The wavelength of the light for which the cholesteric liquid crystal layer 14 exhibits selective reflectivity can be carried out by adjusting the spiral pitch in the cholesteric structure of the liquid crystal material that forms the cholesteric liquid crystal layer 14. In addition, in regard to the cholesteric liquid crystal layer 14 in the transparent screen of the present invention, the spiral axis direction of the cholesteric structure is parallel to the normal direction of the inclined surface of the protruding portion 12b as described later.

The cholesteric liquid crystal layer 14 may be colored; however, it is preferable that the dots are not colored, or the dots are colored to a low extent. Thereby, transparency of the transparent screen can be enhanced.

(Cholesteric Structure)

A cholesteric structure is known to exhibit selective reflectivity for a particular wavelength. The center wavelength λ of selective reflection depends on the pitch of the spiral structure (=period of spiral) in the cholesteric structure, and follows the relation of the average refractive index n of the cholesteric liquid crystal and λ=n×P. Therefore, the selective reflection wavelength can be adjusted by adjusting this pitch of the spiral structure. Since the pitch of the cholesteric structure depends on the type of the chiral agent used together with a polymerizable liquid crystal compound at the time of forming the cholesteric liquid crystal layer 14, or the concentration of addition of the chiral agent, a desired pitch can be obtained by adjusting these. In regard to the adjustment of the pitch, a detailed description is given in Fuji Film Research & Development, No. 50 (2005), p. 60-63. In regard to the method for measuring the sense or pitch of a spiral, the methods described in "Ekisho Kagaku Jikken Nyumon (Introduction to Experiments in Liquid Crystal Chemistry)", edited by Japanese Liquid Crystal Society, published by Sigma Shuppan K.K., 2007, p. 46; and "Ekisho Benran (Handbook of Liquid Crystals)", Editorial Committee for the Handbook of Liquid Crystals, Maruzen, Inc., p. 196, can be used.

A cholesteric structure gives a striped pattern of bright parts and dark parts in a cross-sectional view of the cholesteric liquid crystal layer 14 as observed by a scanning electron microscope (SEM). Two repeated sets of the bright part and the dark part (two bright parts and two dark parts) correspond to one pitch of the spiral. From this, the pitch can be measured from a SEM cross-sectional view. The normal lines to the various lines of the striped pattern become the direction of the spiral axis.

The reflected light of the cholesteric structure is circularly polarized light. That is, the reflected light of the cholesteric liquid crystal layer 14 in the transparent screen 10a is circularly polarized light. Whether the reflected light is right-handed circularly polarized light or left-handed circularly polarized light depends on a twisted direction of the spiral in the cholesteric structure. Selective reflection by a cholesteric liquid crystal occurs such that in a case in which the twisted direction of the spiral of the cholesteric liquid crystal is right-handed, right-handed circularly polarized light is reflected, and in a case in which the twisted direction of the spiral is left-handed, left-handed circularly polarized light is reflected.

According to the present invention, a cholesteric liquid crystal having any of right-handed twist and left-handed twist may be used for the cholesteric liquid crystal layer 14. Alternatively, it is also preferable that the direction of the circularly polarized light is selected to be the same as the direction of circularly polarized light of the light emitted from the light source used in combination.

The direction of rotation of the cholesteric liquid crystalline phase can be adjusted by means of the type of the liquid crystal compound or the type of the chiral agent to be added.

The half-width Δλ (nm) of the selective reflection zone (circularly polarized light reflection zone) that exhibits selective reflection is such that Δλ depends on the birefringence Δn and the pitch P of the liquid crystal compound, and follows the relation of Δλ=Δn×P. Therefore, control of the width of the selective reflection zone can be carried out by adjusting Δn. The adjustment of Δn can be carried out by adjusting the type of the polymerizable liquid crystal compound or the mixing ratio thereof, or by controlling the temperature at the time of alignment immobilization.

The half-width of the reflection wavelength range is adjusted according to, for example, the performance required for the transparent screen 10a, and the like. The half-width of the reflection wavelength range may be, for example, 10 to 500 nm, preferably 25 to 100 nm.

(Method for Producing Cholesteric Structure)

A cholesteric structure can be obtained by immobilizing a cholesteric liquid crystalline phase. The structure in which a cholesteric liquid crystalline phase is immobilized may be a structure in which the alignment of the liquid crystal compound that forms the cholesteric liquid crystalline phase is retained, and typically, the structure may be a structure in which a polymerizable liquid crystal compound is brought into an alignment state of the cholesteric liquid crystalline phase and then is polymerized and cured by ultraviolet irradiation, heating or the like, and a layer lacking fluidity is formed and simultaneously changed into a state that is free of any factor causing a change in the alignment state by an external field or an external force. Meanwhile, in regard to the structure obtained by immobilizing the cholesteric liquid crystalline phase, it is sufficient in a case where the optical properties of the cholesteric liquid crystalline phase are retained, and it is acceptable in a case where the liquid crystal compound has already stopped exhibiting liquid crystal properties. For example, it is acceptable that the polymerizable liquid crystal compound is macromolecularized by a curing reaction and thereby has already lost liquid crystallinity.

The material used for forming the cholesteric liquid crystal layer 14 having the cholesteric structure may be a liquid crystal composition including a liquid crystal compound. The liquid crystal compound is preferably a polymerizable liquid crystal compound.

The liquid crystal composition including a polymerizable liquid crystal compound further includes a surfactant. The liquid crystal composition may further include a chiral agent and a polymerization initiator.

—Polymerizable Liquid Crystal Compound—

The polymerizable liquid crystal compound may be a rod-like liquid crystal compound or a disc-like liquid crystal compound; however, it is preferable that the liquid crystal compound is a rod-like liquid crystal compound.

Examples of a rod-like polymerizable liquid crystal compound that forms a cholesteric liquid crystal layer include a rod-like nematic liquid crystal compound. As the rod-like nematic liquid crystal compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolanes, and alkenylcyclohexylbenzonitriles are preferably used. Low molecular weight liquid crystal compounds as well as polymeric liquid crystal compounds can be used.

A polymerizable liquid crystal compound can be obtained by introducing a polymerizable group into a liquid crystal compound. Examples of the polymerizable group include an unsaturated polymerizable group, an epoxy group, and an aziridinyl group, and an unsaturated polymerizable group is preferred, while an ethylenically unsaturated polymerizable group is particularly preferred. A polymerizable group can be introduced into a molecule of a liquid crystal compound by various methods. The number of polymerizable groups that a polymerizable liquid crystal compound can have is preferably 1 to 6, and more preferably 1 to 3. Examples of the polymerizable liquid crystal compound include the compounds described in Makromol. Chem., Vol. 190, p. 2255 (1989); Advanced Materials, Vol. 5, p. 107 (1993); U.S. Pat. Nos. 4,683,327A, 5,622,648A, 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-

110469A), JP1999-80081A (JP-H11-80081A), and JP2001-328973A. Two or more kinds of polymerizable liquid crystal compounds may be used in combination. In a case where two or more kinds of polymerizable liquid crystal compounds are used in combination, the alignment temperature can be lowered.

Specific examples of the polymerizable liquid crystal compound include compounds represented by Formulae (1) to (11).

Furthermore, regarding the polymeric liquid crystal compound described above, a polymer in which a mesogenic group that exhibits liquid crystallinity has been introduced into a position at the main chain, a side chain, or both of the main chain and a side chain; a polymer cholesteric liquid crystal in which a cholesteryl group has been introduced into a side chain; the liquid crystalline polymer disclosed in JP1997-133810A (JP-H09-133810A); the liquid crystalline (1)
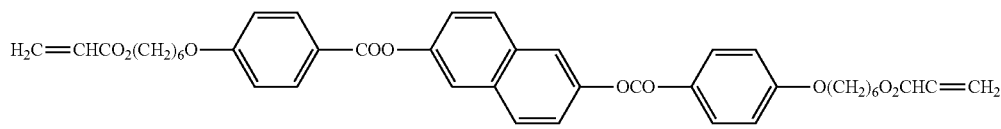

(2)
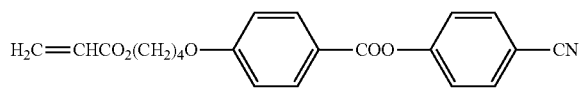

(3)

(4)

(5)

(6)
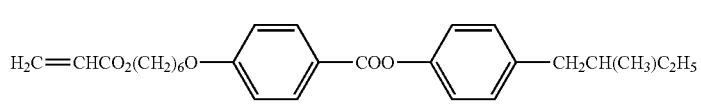

(7)
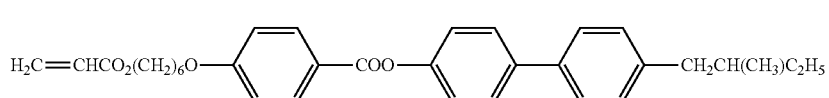

(8)
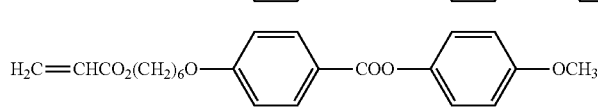

(9)
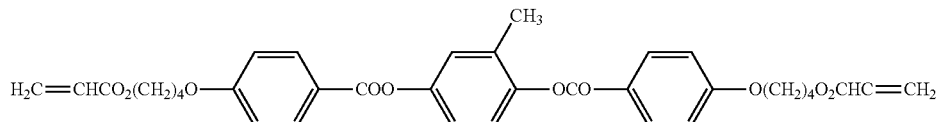

(10)
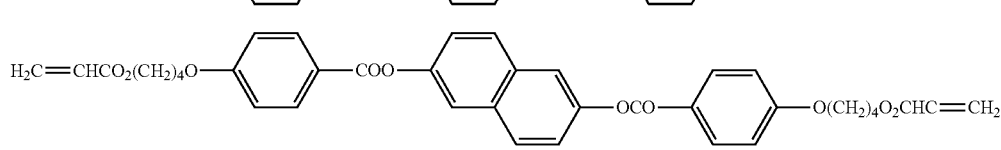

(11)
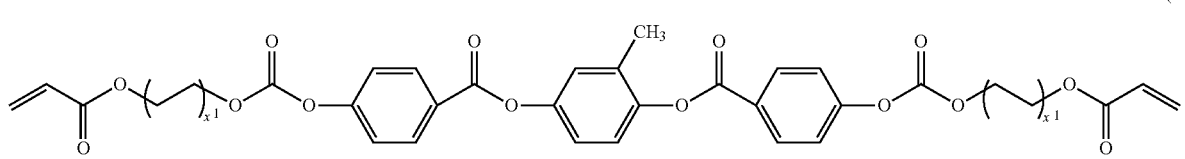

[wherein in Compound (11), X1 is 2 to 5 (integer).]

As a polymerizable liquid crystal compound other than those described above, cyclic organopolysiloxane compounds having a cholesteric phase as disclosed in JP1982-165480A (JP-S57-165480A), and the like can be used.

polymer disclosed in JP1999-293252A (JP-H11-293252A), and the like can be used.

The amount of addition of the polymerizable liquid crystal compound in the liquid crystal composition is preferably 75% to 99.9% by mass, more preferably 80% to 99% by mass, and particularly preferably 85% to 90% by mass, with respect to the solid content mass (mass excluding the solvent) of the liquid crystal composition.

—Surfactant—

The inventors found that by adding a surfactant to the liquid crystal composition that is used in a case where the cholesteric liquid crystal layer 14 is formed, the polymerizable liquid crystal compound is horizontally aligned on the air interface side at the time of forming the cholesteric liquid crystal layer 14, and the cholesteric liquid crystal layer 14 having the direction of the spiral axis controlled as explained above is obtained. Generally, for the purpose of forming the cholesteric liquid crystal layer 14, it is necessary not to lower the surface tension in order to maintain the liquid droplet shape at the time of printing. Therefore, even in a case where a surfactant is added, it is possible to form the cholesteric liquid crystal layer 14.

The surfactant is preferably a compound capable of functioning as an alignment controlling agent that contributes in order to obtain a cholesteric structure with planar alignment stably and rapidly. Examples of the surfactant include silicone-based surfactants and fluorine-based surfactants, and fluorine-based surfactants are preferred.

Examples of the surfactant include the compounds described in paragraphs [0082] to [0090] of JP2014-119605A, the compounds described in paragraphs [0031] to [0034] of JP2012-203237A, the compounds listed as examples in paragraphs [0092] and [0093] of JP2005-99248A, the compounds listed as examples in paragraphs [0076] to [0078] and paragraphs [0082] to [0085] of JP2002-129162A, and the fluoro(meth)acrylate-based polymers described in paragraphs [0018] to [0043] of JP2007-272185A.

As the horizontal alignment agent, one kind of agent may be used singly, or two or more kinds of agents may be used in combination.

As the fluorine-based surfactant, a compound represented by General Formula (I) described in paragraphs [0082] to [0090] of JP2014-119605A is particularly preferred.

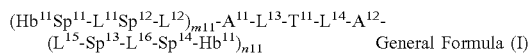

$(Hb^{11}-Sp^{11}-L^{11}-Sp^{12}-L^{12})_{m11}-A^{11}-L^{13}-T^{11}-L^{14}-A^{12}-(L^{15}-Sp^{13}-L^{16}-Sp^{14}-Hb^{11})_{n11}$   General Formula (I)

In General Formula (I), $L^{11}$, $L^{12}$, $L^{13}$, $L^{14}$, $L^{15}$, and $L^{16}$ each independently represent a single bond, —O—, —S—, —CO—, —COO—, —OCO—, —COS—, —SCO—, —NRCO—, or —CONR— (wherein R in General Formula (I) represents a hydrogen atom or an alkyl group having 1 to 6 carbon atoms). —NRCO— and —CONR— have an effect of lowering solubility. —O—, —S—, —CO—, —COO—, —OCO—, —COS—, or —SCO— is more preferable, from the viewpoint of having a tendency that the haze increases at the time of producing the cholesteric liquid crystal layer 14, and —O—, —CO—, —COO—, or —OCO— is even more preferable, from the viewpoint of stability of the compound. The alkyl group that can be adopted by R may be linear or branched. The number of carbon atoms is more preferably 1 to 3, and examples include a methyl group, an ethyl group, and an n-propyl group.

$Sp^{11}$, $Sp^{12}$, $Sp^{13}$, and $Sp^{14}$ each independently represent a single bond or an alkylene group having 1 to 10 carbon atoms, and are each more preferably a single bond or an alkylene group having 1 to 7 carbon atoms, and even more preferably a single bond or an alkylene group having 1 to 4 carbon atoms. However, the hydrogen atoms of the alkylene group may be substituted by fluorine atoms. The alkylene group may or may not be branched; however, an unbranched, linear alkylene group is preferred. From the viewpoint of synthesis, it is preferable that $Sp^{11}$ and $Sp^{14}$ are identical, while $Sp^{12}$ and $Sp^{13}$ are identical.

$A^{11}$ and $A^{12}$ each represent a monovalent to tetravalent aromatic hydrocarbon group. The number of carbon atoms of the aromatic hydrocarbon group is preferably 6 to 22, more preferably 6 to 14, even more preferably 6 to 10, and still more preferably 6. The aromatic hydrocarbon group represented by $A^{11}$ or $A^{12}$ may have a substituent. Examples of such a substituent include an alkyl group having 1 to 8 carbon atoms, an alkoxy group, a halogen atom, a cyano group, and an ester group. Regarding an explanation on these groups and preferred ranges thereof, reference can be made to the description concerning the following T. Examples of the substituent for the aromatic hydrocarbon group represented by $A^{11}$ or $A^{12}$ include a methyl group, an ethyl group, a methoxy group, an ethoxy group, a bromine atom, a chlorine atom, and a cyano group. A molecule having many perfluoroalkyl moieties in the molecule can align liquid crystal molecules even in a case of being added in a small amount, and since this leads to a decrease in the haze, it is preferable that $A^{11}$ and $A^{12}$ are tetravalent so as to have more many perfluoroalkyl groups in the molecule. From the viewpoint of synthesis, it is preferable that $A^{11}$ and $A^{12}$ are identical.

It is preferable that $T^{11}$ represents a divalent group represented by

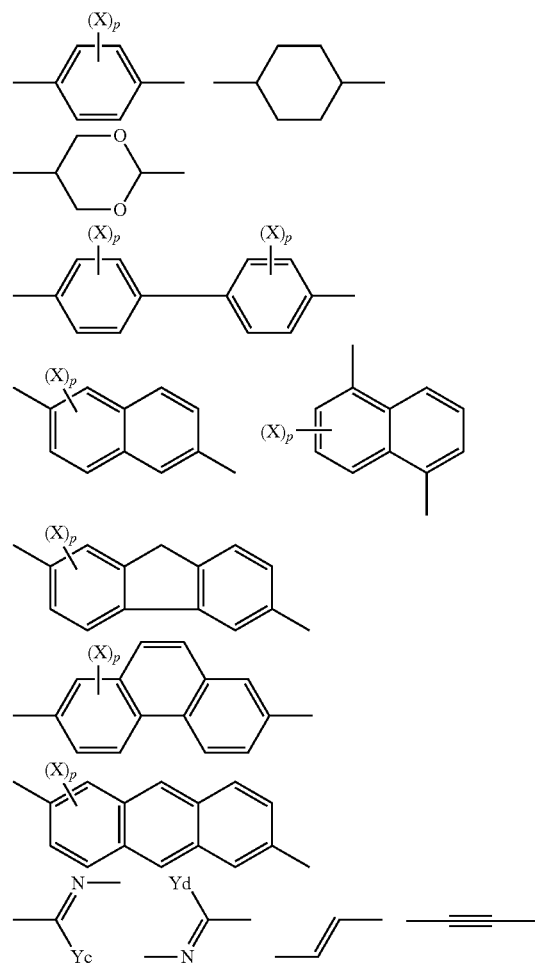

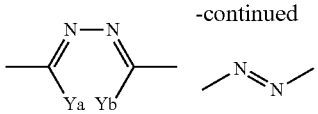

or a divalent aromatic heterocyclic group (wherein X included in $T^{11}$ represents an alkyl group having 1 to 8 carbon atoms, an alkoxy group, a halogen atom, a cyano group, or an ester group; and Ya, Yb, Yc, and Yd each independently represent a hydrogen atom or an alkyl group having 1 to 4 carbon atoms), and $T^{11}$ is more preferably,

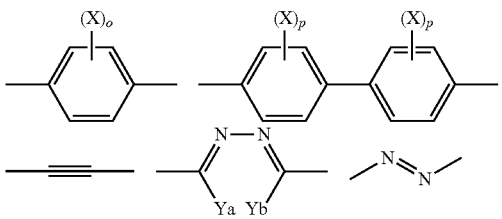

and particularly preferably,

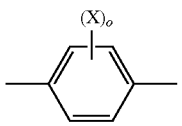

The number of carbon atoms of the alkyl group that can be adopted by X included in T11 is 1 to 8, preferably 1 to 5, and more preferably 1 to 3. The alkyl group may be any of a linear group, a branched group, and a cyclic group, and the alkyl group is preferably a linear or branched group. Preferred examples of the alkyl group include a methyl group, an ethyl group, an n-propyl group, and an isopropyl group, and among them, a methyl group is preferred. For the alkyl moiety of the alkoxy group that can be adopted by X included in $T^{11}$, reference can be made to the explanation and preferred range for the alkyl group that can be adopted by X included in $T^{11}$. Examples of the halogen atom that can be adopted by X include in $T^{11}$ include a fluorine atom, a chlorine atom, a bromine atom, and an iodine atom, and a chlorine atom and a bromine atom are preferred. Examples of the ester group that can be adopted by X included in $T^{11}$ include a group represented by R'COO—. R' may be an alkyl group having 1 to 8 carbon atoms. Regarding the explanation and a preferred range for the alkyl group that can be adopted by R', reference can be made to the explanation and preferred range for the alkyl group that can be adopted by X included in $T^{11}$. Specific examples of the ester include $CH_3COO$— and $C_2H_5COO$—. The alkyl group having 1 to 4 carbon atoms that can be adopted by Ya, Yb, Yc, and Yd may be a linear group or a branched group. Examples thereof include a methyl group, an ethyl group, an n-propyl group, and an isopropyl group.

It is preferable that the divalent aromatic heterocyclic group has a 5-membered, 6-membered, or 7-membered heterocyclic ring. A 5-membered ring or a 6-membered ring is more preferred, and a 6-membered ring is most preferred. Preferred examples of the heteroatom that constitutes the heterocyclic ring include a nitrogen atom, an oxygen atom, and a sulfur atom. The heterocyclic ring is preferably an aromatic heterocyclic ring. The aromatic heterocyclic ring is generally an unsaturated heterocyclic ring. An unsaturated heterocyclic ring having the largest number of double bonds is more preferred. Examples of the heterocyclic ring include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a thiine ring, a pyridine ring, a piperidine ring, an oxazine ring, a morpholine ring, a thiazine ring, a pyridazine ring, a pyrimidine ring, a pyrazine ring, a piperazine ring, and a triazine ring. The divalent heterocyclic group may have a substituent. Regarding the explanation and preferred ranges for the examples of the substituent, reference can be made to the explanation and description related to the substituent that can be adopted by the monovalent to tetravalent aromatic hydrocarbon of $A^1$ and $A^2$.

$Hb^{11}$ represents a perfluoroalkyl group having 2 to 30 carbon atoms, and $Hb^{11}$ is more preferably a perfluoroalkyl group having 3 to 20 carbon atoms, and even more preferably a perfluoroalkyl group having 3 to 10 carbon atoms. The perfluoroalkyl group may be any of a linear group, a branched group, and a cyclic group; however, the perfluoroalkyl group is preferably a linear or branched group, and more preferably a linear group.

m11 and n11 each independently represent 0 to 3, and m11+n11≥1. At this time, a plurality of the structures described within the parentheses may be identical with or different from each other; however, it is preferable that the structures are identical with each other. m11 and n11 in General Formula (I) are determined based on the valence of $A^{11}$ and $A^{12}$, and preferred ranges thereof are also determined based on the preferred ranges for the valence of $A^{11}$ and $A^{12}$.

o and p included in $T^{11}$ each independently represent an integer of 0 or larger, and in a case where o and p are 2 or larger, the plurality of X's may be identical with or different from each other. o included in $T^{11}$ is preferably 1 or 2. p included in $T^{11}$ is preferably an integer of 1 to 4, and more preferably 1 or 2.

The compound represented by General Formula (I) is such that the molecular structure may have symmetry, or may not have symmetry. The term symmetry as used herein means that the molecular structure corresponds to at least any one of point symmetry, line symmetry, and rotational symmetry, and the term asymmetry means that the molecular structure does not correspond to any of point symmetry, line symmetry, and rotational symmetry.

The compound represented by General Formula (I) is a compound in which the perfluoroalkyl group ($Hb^{11}$) described above, linking groups -(-$Sp^{11}$-$L^{11}$-$Sp^{12}$-$L^{12}$-)$_{m11}$-$A^{11}$-$L^{13}$- and -$L^{14}$-$A^{12}$-($L^{15}$-$Sp^{13}$-$L^{16}$-$Sp^{14}$-)$_{m11}$-, and T, which is preferably a divalent group having an excluded volume effect, are combined. It is preferable that the two perfluoroalkyl group ($Hb^{11}$) existing in the molecule are identical with each other, and it is also preferable that the linking groups -(-$Sp^{11}$-$L^{11}$-$Sp^{12}$-$L^{12}$-)$_{m11}$-$A^{11}$-$L^{13}$- and -$L^{14}$-$A^{12}$-($L^{15}$-$Sp^{13}$-$L^{16}$-$Sp^{14}$-)$_{n11}$- existing in the molecule are also identical with each other. It is preferable that terminal $Hb^{11}$-$Sp^{11}$-$L^{11}$-$Sp^{12}$- and -$Sp^{13}$-$L^{16}$-$Sp^{14}$-$Hb^{11}$ are groups represented by any of the following general formulae.

$(C_aF_{2a+1})-(C_bH_{2b})-$ $(C_aF_{2a+1})-(C_bH_{2b})-O-(C_rH_{2r})-$

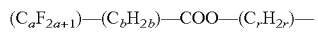

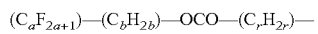

In the above formulae, a is preferably 2 to 30, more preferably 3 to 20, and even more preferably 3 to 10. b is preferably 0 to 20, more preferably 0 to 10, and even more preferably 0 to 5. a+b is 3 to 30. r is preferably 1 to 10, and more preferably 1 to 4.

Furthermore, it is preferable that the terminal $Hb^{11}$-$Sp^{11}$-$L^{11}Sp^{12}$-$L^{12}$- and -$L^{15}$-$Sp^{13}$-$L^{16}$-$Sp^{14}$-$Hb^{11}$ in General Formula (I) are each a group represented by any of the following general formulae.

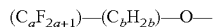

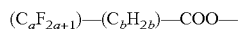

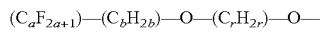

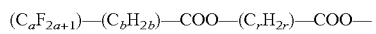

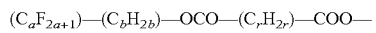

The definitions of a, b, and r in the above formulae are the same as the definitions given right above.

The amount of addition of the surfactant in the liquid crystal composition is preferably 0.01% by mass to 10% by mass, more preferably 0.01% to 5% by mass, and particularly preferably 0.02% to 1% by mass, with respect to the total mass of the polymerizable liquid crystal compound.

—Chiral Agent (Optically Active Compound)—

A chiral agent has a function of creating a spiral structure of the cholesteric liquid crystalline phase. Since chiral compounds have different twisted directions of the spiral or different pitches of the spiral created by the compounds, the chiral compound may be selected according to the purpose.

There are no particular limitations on the chiral agent, and known compounds (for example, described in Handbook of Liquid Crystal Devices, Chapter 3, Section 4-3, Chiral agents for TN and STN, p. 199, edited by the 142$^{nd}$ Committee of Japan Society for the Promotion of Science (1989)), isosorbide, and isomannide derivatives can be used.

A chiral agent generally includes an asymmetric carbon atom; however, an axially asymmetric compound or a plane-asymmetric compound, which does not include an asymmetric carbon atom, can also be used as a chiral agent. Examples of the axially asymmetric compound or plane-asymmetric compound include binaphthyl, helicene, paracyclophane, and derivatives thereof. The chiral agent may have a polymerizable group. In a case in which both the chiral agent and the liquid crystal compound have a polymerizable group, a polymer having a repeating unit derived from a polymerizable liquid crystal compound and a repeating unit derived from a chiral agent can be formed by a polymerization reaction between the polymerizable chiral agent and the polymerizable liquid crystal compound. In the aspect, it is preferable that the polymerizable group of the polymerizable chiral agent is a group of the same kind as the polymerizable group of the polymerizable liquid crystal compound. Therefore, it is preferable that the polymerizable group of the chiral agent is also an unsaturated polymerizable group, an epoxy group, or an aziridinyl group; more preferably an unsaturated polymerizable group; and particularly preferably an ethylenically unsaturated polymerizable group.

The chiral agent may also be a liquid crystal compound.

In a case in which the chiral agent has a photoisomerizable group, it is preferable since a desired pattern of reflection wavelength corresponding to the emitted light wavelength can be formed by photomask irradiation with active light rays or the like after application and alignment. The photoisomerizable group is preferably an isomerization site of a compound exhibiting photochromic properties, an azo group, an azoxy group, or a cinnamoyl group. Specific compounds that can be used include the compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

Specific examples of the chiral agent include a compound represented by Formula (12).

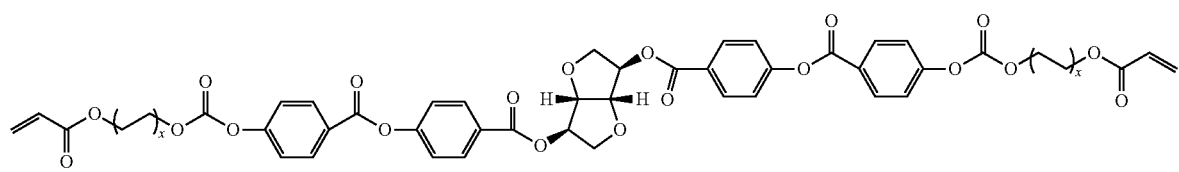

(12)

wherein X represents 2 to 5 (integer).

The content of the chiral agent in the liquid crystal composition is preferably 0.01 to 200 mol %, and more preferably 1 to 30 mol %, of the amount of the polymerizable liquid crystal compound.

—Polymerization Initiator—

In a case in which a polymerizable compound is included in the liquid crystal composition, it is preferable that the liquid crystal composition includes a polymerization initiator. In an aspect of carrying out a polymerization reaction by ultraviolet irradiation, the polymerization initiator to be used is preferably a photopolymerization initiator capable of initiating the polymerization reaction by ultraviolet irradiation. Examples of the photopolymerization initiator include a-carbonyl compounds (described in U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of a triarylimidazole dimer and p-aminophenyl ketone (described in U.S. Pat. No. 3,549,367A), acridine and phenazine compounds (described in JP1985-105667A (JP-S60-105667A) and U.S. Pat. No. 4,239,850A), and oxadiazole compounds (described in U.S. Pat. No. 4,212,970A).

The content of the photopolymerization initiator in the liquid crystal composition is preferably 0.1% to 20% by mass, and more preferably 0.5 to 12% by mass, with respect to the content of the polymerizable liquid crystal compound.

—Crosslinking Agent—

The liquid crystal composition may optionally include a crosslinking agent for the purpose of enhancing the film hardness after curing and enhancing durability. Regarding the crosslinking agent, an agent capable of curing by means of ultraviolet radiation, heat, moisture, or the like can be suitably used.

The crosslinking agent is not particularly limited and can be appropriately selected according to the purpose. Examples include polyfunctional acrylate compounds such as trimethylolpropane tri(meth)acrylate and pentaerythritol tri(meth)acrylate; epoxy compounds such as glycidyl (meth)acrylate and ethylene glycol diglycidyl ether; aziridine compounds such as 2,2-bishydroxymethylbutanol tris[3-(1-aziridinyl) propionate] and 4,4-bis(ethyleneiminocarbonylamino)diphenylmethane; isocyanate compounds such as hexamethylene diisocyanate and biuret type isocyanate; polyoxazoline compounds having an oxazoline group in a side chain; and alkoxysilane compounds such as vinyltrimethoxysilane and N-(2-aminoethyl) 3-aminopropyltrimethoxysilane. Furthermore, a known catalyst can be used according to the reactivity of the crosslinking agent, and thus productivity can be enhanced in addition to the enhancement of film hardness and durability. These may be used singly, or two or more kinds thereof may be used in combination.

The content of the crosslinking agent is preferably 3% to 20% by mass, and more preferably 5% to 15% by mass. In a case where the content of the crosslinking agent is less than 3% by mass, an effect of increasing the crosslinking density may not be obtained, and in a case where the content is more than 20% by mass, stability of the cholesteric liquid crystal layer may be deteriorated.

—Other Additives—

In the case of using the inkjet method as the method for forming the cholesteric liquid crystal layer 14, a monofunctional polymerizable monomer may be used in order to obtain ink properties that are generally required. Examples of the monofunctional polymerizable monomer include 2-methoxyethyl acrylate, isobutyl acrylate, isooctyl acrylate, isodecyl acrylate, and octyl/decyl acrylate.

The liquid crystal composition may further include, if necessary, a polymerization inhibitor, an antioxidant, an ultraviolet absorber, a photostabilizer, a coloring material, and metal oxide fine particles, to the extent that the optical performance and the like are not deteriorated.

It is preferable that the liquid crystal composition is used as a liquid at the time of forming the cholesteric liquid crystal layer 14.

The liquid crystal composition may include a solvent. The solvent is not particularly limited and can be appropriately selected according to the purpose; however, an organic solvent is preferably used.

The organic solvent is not particularly limited and can be appropriately selected according to the purpose. Examples thereof include ketones such as methyl ethyl ketone and methyl isobutyl ketone; alkyl halides, amides, sulfoxides, heterocyclic compounds, hydrocarbons, esters, and ethers. These may be used singly, or two or more kinds thereof may be used in combination. Among these, in a case where the environmental burden is taken into consideration, ketones are particularly preferred. The above-mentioned components such as the monofunctional polymerizable monomer may also function as the solvent.

The liquid crystal composition is applied to the support 12, dried, and then cured so to form the cholesteric liquid crystal layer 14.

The application of the liquid crystal composition can be carried out using a known application device such as a bar coater such as a wire bar coater, a die coater, a wire coater, a spin coater, a doctor blade, and the like.

Alternatively, in a case where the cholesteric liquid crystal layer is formed only on the inclined surface as shown in FIG. 1, a printing method can be suitably used. The printing method is not particularly limited, and an inkjet method, a gravure printing method, a flexographic printing method, and the like can be used.

Furthermore, as described later, in one cholesteric liquid crystal layer, in a case where a plurality of regions that reflect light in wavelength regions different from each other are provided, first, a first layer is formed by applying a liquid crystal composition that becomes a layer on the support 12 side and curing the liquid crystal composition, and then a second layer is formed by jetting of a liquid crystal composition that becomes a second layer on the first layer and curing the liquid crystal composition. Furthermore, a third layer and so forth are also formed by the same method. Thereby, the cholesteric liquid crystal layer 14 having a plurality of regions having different wavelength regions or directions of polarization of reflected light can be formed.

The liquid crystal composition applied to the support 12 is dried or heated as necessary, and then is cured. It is desirable in a case where the polymerizable liquid crystal compound in the liquid crystal composition is aligned by the process of drying or heating. In the case of performing heating, the heating temperature is preferably 200° C. or lower, and more preferably 130° C. or lower.

The liquid crystal compound thus aligned may be further polymerized. Polymerization may be any of thermal polymerization and photopolymerization based on light irradiation; however, photopolymerization is preferred. It is preferable to use ultraviolet radiation for light irradiation. The irradiation energy is preferably 20 to 50 $J/cm^2$, and more preferably 10 to 1,500 $mJ/cm^2$. In order to accelerate the photopolymerization reaction, light irradiation may be carried out under heating conditions or in a nitrogen atmosphere. The wavelength of ultraviolet radiation radiated is preferably 250 to 430 nm. The polymerization reaction ratio is preferably higher from the viewpoint of stability, and the polymerization reaction ratio is preferably 70% or higher, and more preferably 80% or higher.

The polymerization reaction ratio can be determined by determining the consumption ratio of the polymerizable functional group using an IR absorption spectrum.

The overcoat layer 16 is formed on the cholesteric liquid crystal layer 14.

The overcoat layer 16 is provided on the surface side of the support 12 on which the cholesteric liquid crystal layer 14 is formed, so as to cover the cholesteric liquid crystal layer 14. In addition, the surface of the overcoat layer 16 is substantially flat and substantially parallel to the main surface of the substrate 12a of the support 12.

The overcoat layer 16 is not particularly limited; however, it is preferable as the difference in the refractive index between the overcoat layer and the cholesteric liquid crystal layer 14 is smaller, and the difference in the refractive index is 0.2 or less, and 0.05 or less is more preferable. For example, since the refractive index of the cholesteric liquid crystal layer 14 formed of a liquid crystal material is about 1.6, it is preferable that the overcoat layer is a resin layer having a refractive index of about 1.4 to 1.8. By using the overcoat layer 16 having a refractive index close to the refractive index of the cholesteric liquid crystal layer 14, it is possible to suppress reflection at the interface due to the difference in refractive index between the cholesteric liquid crystal layer 14 and the overcoat layer 16, and thus the transparency can be increased.

In addition, it is preferable that the difference in refractive index between the overcoat layer 16 and the support 12 is small.

The overcoat layer 16 may also have a function as an antireflection layer, a pressure-sensitive adhesive layer, or an adhesive layer.

Examples of the overcoat include a resin layer obtained by applying a composition containing a monomer to the surface of the cholesteric liquid crystal layer 14 and thereafter curing the coating film, and the like.

A resin is not particularly limited and may be selected in consideration of adhesiveness to a liquid crystal material with which the support 12 and/or the cholesteric liquid crystal layer 14 is formed, or the like. For example, a thermoplastic resin, a thermosetting resin, and an ultraviolet-curable resin can be used. In view of durability, solvent resistance, and the like, a resin of the type that is cured by crosslinking is preferred, and particularly, an ultraviolet-curable resin that can be cured in a short period of time is preferred. Examples of the monomer that can be used to form the overcoat include ethyl (meth)acrylate, ethylhexyl (meth)acrylate, styrene, methylstyrene, N-vinylpyrrolidone, polymethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

The thickness of the overcoat is not particularly limited, and may be determined in consideration of the maximum height of the cholesteric liquid crystal layer 14. The thickness may be about 1 μm to 270 μm, preferably 5 μm to 180 μm, and more preferably 9 μm to 90 μm. The thickness is the distance from the surface of the support 12 where the cholesteric liquid crystal layer 14 is absent to the overcoat surface on the opposite surface.

In the transparent screen 10a shown in FIG. 1, all the cholesteric liquid crystal layers 14 reflect light in the same wavelength region, but the configuration is not limited thereto, and a configuration of having two or more cholesteric liquid crystal layers each reflecting light in different wavelength regions, may be adopted.

For example, a configuration having a plurality of each of a cholesteric liquid crystal layer that reflects red light within the wavelength region of 610 nm to 690 nm, a cholesteric liquid crystal layer that reflects green light within the wavelength region of 515 nm to 585 nm, and a cholesteric liquid crystal layer that reflects blue light within the wavelength region of 420 nm to 480 nm, may be adopted.

As such, in a case of forming the cholesteric liquid crystal layer that reflects red light, the cholesteric liquid crystal layer that reflects green light, and the cholesteric liquid crystal layer that reflects blue light, it is preferable from the viewpoint that the red light, green light and blue light of the incident video light can be reflected, and a video image that is projected on the transparent screen can be displayed as a color image, and from the viewpoint that the video light emitted from a video device such as a projector can be utilized regardless of whether the light is red light, green light or blue light.

The example described above is configured to include the cholesteric liquid crystal layers that respectively reflect red light, green light, and blue light; however, the present invention is not intended to be limited to this, and the transparent screen may also include cholesteric liquid crystal layer that reflects light in other wavelength regions.

It is desirable that the cholesteric liquid crystal layers that respectively reflect red light, green light, and blue light are dots reflecting light in the above-mentioned wavelength regions, and it is also acceptable that the peak wavelength of the reflected waves may not be included in the range of the wavelength regions described above.

In addition, the present invention is not limited to a configuration including three kinds of the cholesteric liquid crystal layers that reflect red light, green light, and blue light, respectively, and for example, a configuration including two kinds of cholesteric liquid crystal layers such as the cholesteric liquid crystal layer that reflects red light and the cholesteric liquid crystal layer that reflects blue light may be employed, or a configuration including four or more kinds of cholesteric liquid crystal layers such as the cholesteric liquid crystal layers respectively reflect red light, green light, and blue light, as well as cholesteric liquid crystal layers that reflect light in another wavelength region may also be employed. Furthermore, by adjusting the reflection wavelength of the cholesteric liquid crystal layer according to the wavelength of the video light emitted from the video device such as a projector, it is possible to efficiently reflect only the video light so that the light of a wavelength not included in the video light into can be transmitted, and therefore the transparency can be further enhanced. Furthermore, by making the wavelength of the video light emitted from the video device such as a projector, narrow band so that the reflection band of the cholesteric liquid crystal layer of the transparent screen is matched, the effect thereof can be enhanced.

In addition, in a case where two or more kinds of the cholesteric liquid crystal layers that each reflect light in different wavelength regions are provided, the arrangement of the cholesteric liquid crystal layer is not particularly limited and may be alternately arranged, or randomly arranged, for example.

The reflected light of the cholesteric structure of the liquid crystal material that constitutes the cholesteric liquid crystal layers is circularly polarized light. That is, the cholesteric structure of the liquid crystal material selectively reflects one of right-handed circularly polarized light or left-handed circularly polarized light and transmits the other.

Therefore, according to the present invention, the plurality of cholesteric liquid crystal layers thus formed may be configured such that all of the cholesteric liquid crystal layers reflect the same circularly polarized light or may be configured to include right-handed polarizing cholesteric liquid crystal layers that reflect right-handed circularly polarized light and left-handed polarizing cholesteric liquid crystal layers that reflect left-handed circularly polarized light.

In a case where the transparent screen is configured to include the cholesteric liquid crystal layers that reflect right-handed circularly polarized light and the cholesteric liquid crystal layers that reflect left-handed circularly polarized light, it is preferable from the viewpoint that right-handed circularly polarized light and left-handed circularly polarized light of the video light can be reflected, and the reflectance can be increased; from the viewpoint that stereoscopic vision (so-called 3D display) can be implemented by displaying images for the left eye or images for the right eye of a viewer for the right-handed circularly polarized light and the left-handed circularly polarized light, respectively; from the viewpoint that the video light emitted from a video device such as a projector can be utilized even though the video light is right-handed circularly polarized light or left-handed circularly polarized light; and the like.

In addition, in a case where the cholesteric structure of the liquid crystal material selectively reflects one of right-handed circularly polarized light and left-handed circularly polarized light and transmits the other, the video light emitted from the video device such as a projector is converted into any one of right-handed circularly polarized light or left-handed circularly polarized light and combines with the transparent screen using the cholesteric liquid crystal layer that reflects circularly polarized light corresponding to the video light. Therefore, only the video light is efficiently reflected, and thus circularly polarized light not included in the video light can be transmitted. Therefore, the transparency can be further enhanced.

The circularly polarized light-selective reflectivity concerning whether the reflected light of a cholesteric structure is right-handed circularly polarized light or left-handed circularly polarized light, depends on the twisted direction of the spiral of the cholesteric structure. Selective reflection by a cholesteric liquid crystal occurs such that in a case in which the twisted direction of the spiral of the cholesteric liquid crystal is right-handed, right-handed circularly polarized light is reflected, and in a case in which the twisted direction of the spiral is left-handed, left-handed circularly polarized light is reflected.

It is also acceptable that the transparent screen has two or more kinds of the cholesteric liquid crystal layers that reflect light in the wavelength regions different from each other and has the cholesteric liquid crystal layers that reflect right-handed circularly polarized light and the cholesteric liquid crystal layers that reflect left-handed circularly polarized light as the cholesteric liquid crystal layers that reflect light in various wavelength regions.

The transparent screen which is configured to include two or more cholesteric liquid crystal layers each reflecting light of different wavelength regions, and include, as the cholesteric liquid crystal layers each reflecting light of different wavelength regions, the cholesteric liquid crystal layer reflecting right-handed circularly polarized light and the cholesteric liquid crystal layer reflecting left-handed circularly polarized light, is preferable from the viewpoints that an image projected on the transparent screen can be displayed in color, that an image for the left eye or an image for the right eye of the viewer is displayed by right-handed circularly polarized light and left-handed circularly polarized light of the video light, respectively, and thus stereoscopic vision can be performed (so-called 3D display), and that video light emitted from a video device such as a projector can be used irrespective of the wavelength region and the direction of circular polarization.

In addition, the example illustrated in FIG. 1 is configured such that each of the various cholesteric liquid crystal layers reflects light in one wavelength region; however, the present invention is not intended to be limited to this, and the transparent screen may also be configured such that a single cholesteric liquid crystal layer reflects light in a plurality of wavelength regions. That is, the transparent screen may be configured to include cholesteric liquid crystal layers having two or more layers that reflect light in wavelength regions different from each other in a single cholesteric liquid crystal layer.

Figure 7:
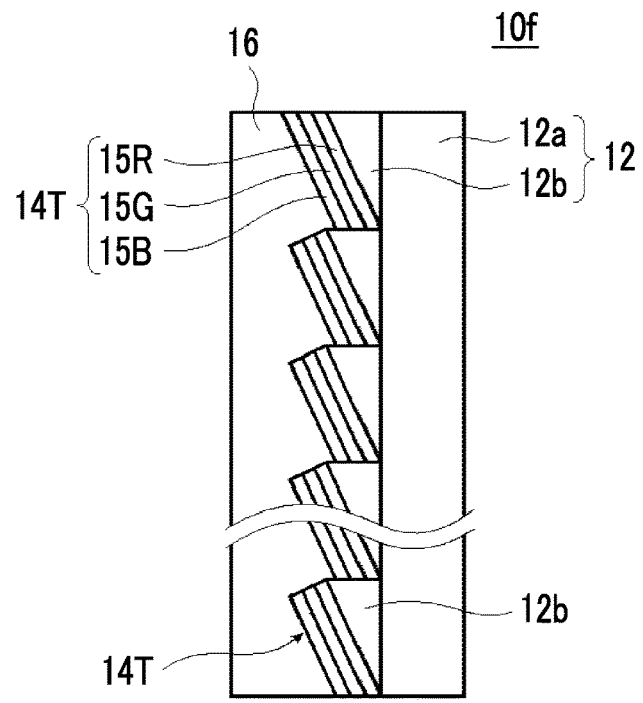
FIG. 7 is a diagram conceptually showing still another example of the transparent screen of the present invention.

FIG. 7 illustrates a schematic cross-sectional view of another example of the transparent screen of the present invention.

A transparent screen 10f shown in FIG. 7 has, as a cholesteric liquid crystal layer, a configuration having a three-layered cholesteric liquid crystal layer 14T having a red layer 15R for reflecting red light, a green layer 15G for reflecting green light, a blue layer 15B for reflecting blue light, in one cholesteric liquid crystal layer.

Specifically, the three-layered cholesteric liquid crystal layer 14T has a configuration in which three layers, which are, the red layer 15R, the green layer 15G laminated on the surface of the red layer 15R, and the blue layer 15B laminated on the surface of the green layer 15G, on the protruding portion 12b side, are laminated in the normal direction of the substrate 12.

Since such the three-layered cholesteric liquid crystal layer 14T has a layer reflecting red light, a layer reflecting green light, and a layer reflecting blue light, red light, green light, and blue light of the incident video light can be reflected with a single cholesteric liquid crystal layer.

Therefore, the video image projected on the transparent screen can be displayed as a color image. The transparent screen can be utilized even in a case where the video light emitted from a video device such as a projector is red light, or green light, or blue light. Furthermore, red light, green light and blue light of the video light can be reflected, and the reflectance can be enhanced.

The example illustrated in FIG. 7 is configured to have three layers respectively reflecting red light, green light, and blue light; however, the present invention is not limited to this, and the configuration may include two layers that reflect light in wavelength regions different from each other or may include four or more layers.

In addition, in the example illustrated in FIG. 7, the three-layered cholesteric liquid crystal layer 14T is configured such that the red layer 15R, the green layer 15G, and the blue layer 15B are laminated in this order from the protruding portion 12b side; however, the present invention is not intended to be limited to this, the order of lamination of the various layers may be of any order.

In addition, a configuration in which each of the various cholesteric liquid crystal layers reflects any one of right-handed circularly polarized light and left-handed circularly polarized light; however, the present invention is not intended to be limited to this, and the transparent screen may also be configured such that a single cholesteric liquid crystal layer reflects right-handed circularly polarized light and left-handed circularly polarized light, may be adopted. That is, the transparent screen may be configured to include cholesteric liquid crystal layers having a region that reflects right-handed circularly polarized light and a region that reflects left-handed circularly polarized light in a single cholesteric liquid crystal layer.

Such a cholesteric liquid crystal layer has a layer that reflects right-handed circularly polarized light and a layer that reflects left-handed circularly polarized light, and therefore it is possible to reflect right-handed circularly polarized light and left-handed circularly polarized light of incident video light with a single cholesteric liquid crystal layer.

Therefore, right-handed circularly polarized light and left-handed circularly polarized light of video light can be reflected, and the reflectance can be enhanced. Furthermore, stereoscopic vision (so-called 3D display) can be implemented by displaying images for the left eye or images for the right eye of a viewer for the right-handed circularly polarized light and the left-handed circularly polarized light of video light, respectively. Also, the transparent screen can be utilized even in a case where the video light emitted from a video device such as a projector is right-handed circularly polarized light or left-handed circularly polarized light.

Furthermore, the single cholesteric liquid crystal layer may also be configured such that the cholesteric liquid crystal layer reflects light in a plurality of wavelength regions, and reflects right-handed circularly polarized light and left-handed circularly polarized light of each of the wavelength regions.

In addition, in the present invention, a plurality of transparent screen units laminated in the thickness direction may be used as one transparent screen as one unit of the transparent screen described above. In this case, it is preferable that each transparent screen unit reflects light in different wavelength regions.

Figure 8:
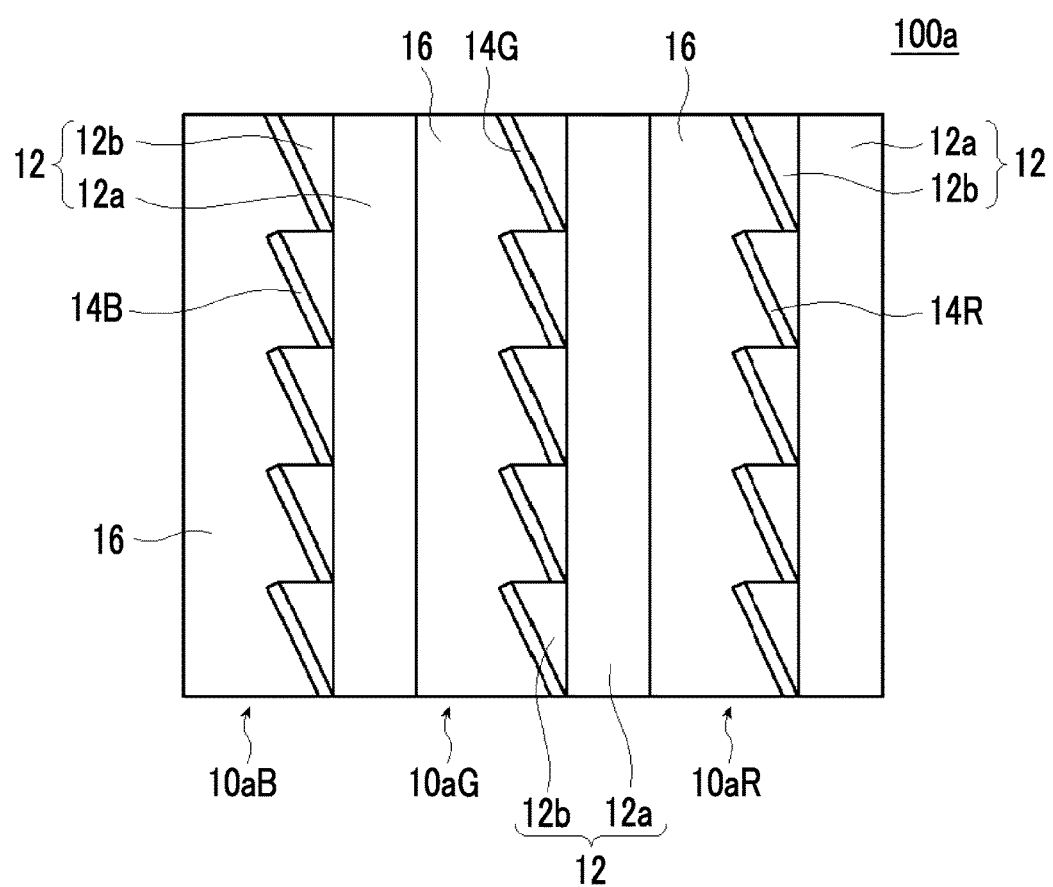
FIG. 8 is a diagram conceptually showing still another example of the transparent screen of the present invention.

FIG. 8 illustrates another example of the transparent screen of the present invention.

A transparent screen 100*a* shown in FIG. 8 has a configuration in which three transparent screen units 10*a*R, 10*a*G, and 10*a*B are laminated in the thickness direction, with the above-described transparent screen 10*a* one transparent screen unit.

In addition, each transparent screen unit reflects light in a different wavelength region, the transparent screen unit 10*a*R has a red cholesteric liquid crystal layer 14R reflecting red light, the transparent screen unit 10*a*G has a green cholesteric liquid crystal layer 14G reflecting green light, and the transparent screen unit 10*a*B has the blue cholesteric liquid crystal layer 14B reflecting blue light.

As such, by adopting a configuration in which a plurality of transparent screen units reflecting light in different wavelength regions are laminated, the red light, green light, and blue light of the incident video light can be reflected, a video image that is projected on the transparent screen can be displayed as a color image, and the video light emitted from a video device such as a projector can be utilized regardless of whether the light is red light, green light, or blue light.

In the transparent screen unit 10*a*R, the transparent screen unit 10*a*G, and the transparent screen unit 10*a*B, the material for forming the support 12 and/or the thickness thereof may be the same as or different from each other.

In the transparent screen unit 10*a*R, the transparent screen unit 10*a*G and the transparent screen unit 10*a*B, the material for forming the cholesteric liquid crystal layer 14 and/or the thickness thereof may be the same as or different from each other.

In addition, in the transparent screen unit 10*a*R, the transparent screen unit 10*a*G, and the transparent screen unit 10*a*B, the spiral axis angle $\theta_1$ may be the same as or different from each other.

In addition, in the transparent screen 100*a*, the transparent screen unit 10*a*R, the transparent screen unit 10*a*G, and the transparent screen unit 10*a*B are laminated and adhered by an adhesive corresponding to the material for forming the overcoat layer 16 and the support 12. Alternatively, the overcoat layer 16 may also be used as an adhesive.

As the adhesive, an adhesive having sufficient light transmittance is used.

In addition, in the transparent screen 100*a*, the transparent screen unit 10*a*R, the transparent screen unit 10*a*G, and the transparent screen unit 10*a*B are laminated in this order, but the present invention is not limited thereto, and the order of laminating the transparent screen unit 10*a*R, the transparent screen unit 10*a*G, and the transparent screen unit 10*a*B is not limited.

Thus, the transparent screen of the present invention has been explained in detail; however, the present invention is not intended to be limited to the examples described above.

It is obvious that various improvements and modifications may be made to the extent that the gist of the present invention is maintained.

EXAMPLES

Features of the present invention will be more specifically explained below by way of Examples. The materials, reagents, amounts of use, amounts of materials, ratios, treatments, procedures, and the like disclosed in the following Examples can be modified as appropriate as long as the gist of the present invention is maintained. Therefore, the scope of the present invention should not be interpreted limitedly by the specific examples described below.

Example 1

As Example 1, a three-layer transparent screen 100*a* as shown in FIG. 8 was produced.

<Production of Support>

<<Production of Substrate>>

The following composition was charged into a mixing tank and stirred while heating so as to dissolve each component, and therefore a cellulose acetate solution was prepared.

(Composition of Cellulose Acetate Solution)

| | |
|---|---|
| Cellulose acetate with an acetylation degree of 60.7% to 61.1% | 100 parts by mass |
| Triphenyl phosphate (plasticizer) | 7.8 parts by mass |
| Biphenyl diphenyl phosphate (plasticizer) | 3.9 parts by mass |
| Methylene chloride (first solvent) | 336 parts by mass |
| Methanol (second solvent) | 29 parts by mass |
| 1-Butanol (third solvent) | 11 parts by mass |

16 parts by mass of the following retardation enhancer (A), 92 parts by mass of methylene chloride, and 8 parts by mass of methanol were charged into another mixing tank, and stirred while heating, and therefore a retardation enhancer solution was prepared. 25 parts by mass of the retardation enhancer solution was mixed to 474 parts by mass of the cellulose acetate solution and thoroughly stirred, and therefore a dope was prepared. The amount of addition of the retardation enhancer was 6.0 parts by mass with respect to 100 parts by mass of cellulose acetate.

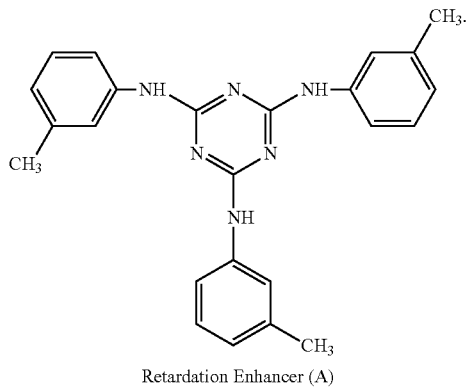 [SMILES: Cc1cccc(Nc2nc(Nc3cccc(C)c3)nc(Nc3cccc(C)c3)n2)c1]

Retardation Enhancer (A)

The obtained dope was cast using a band stretching machine. After the temperature of the film surface on the band reached 40° C., the film was dried with warm air at 70° C. for 1 minute and dried from the band with drying air at 140° C. for 10 minutes, and therefore a triacetyl cellulose film having a residual solvent amount of 0.3% by mass was produced.

This film was used as a substrate.

<<Formation of Protruding Portion>>

UV curable resin (PAK-02, manufactured by Toyo Gosei Co., Ltd) was added dropwise to a mold having a plurality of sawtooth-shaped right-angled triangles (made of nickel, right-angled triangle's length: 100 μm, height: 18 μm, and inclination angle of the inclined surface: 10°), and the substrate was covered thereon. It was confirmed that the UV curable resin was spread over the whole substrate, and after irradiation with ultraviolet rays of 500 mJ/cm², the substrate and the mold were peeled off from each other, and therefore the support was produced.

<Production of Transparent Screen Unit>

<<Preparation of Liquid Crystal Solution for Blue Cholesteric Liquid Crystal Layer>>

A cholesteric liquid crystal solution 1 as described below was stirred and dissolved in a vessel that had been kept warm at 25° C., and thus the cholesteric liquid crystal solution 1 was prepared.

(Cholesteric Liquid Crystal Solution 1)

| | |
|---|---|
| Methoxy ethyl acrylate | 145 parts by mass |
| Mixture of the following rod-like liquid crystal compound | 100 parts by mass |
| IRGACURE 819 (manufactured by BASF SE) | 10 parts by mass |
| Chiral agent A having the following structure | 5.78 parts by mass |
| Surfactant having the following structure | 0.08 parts by mass |

Rod-Like Liquid Crystal Compound

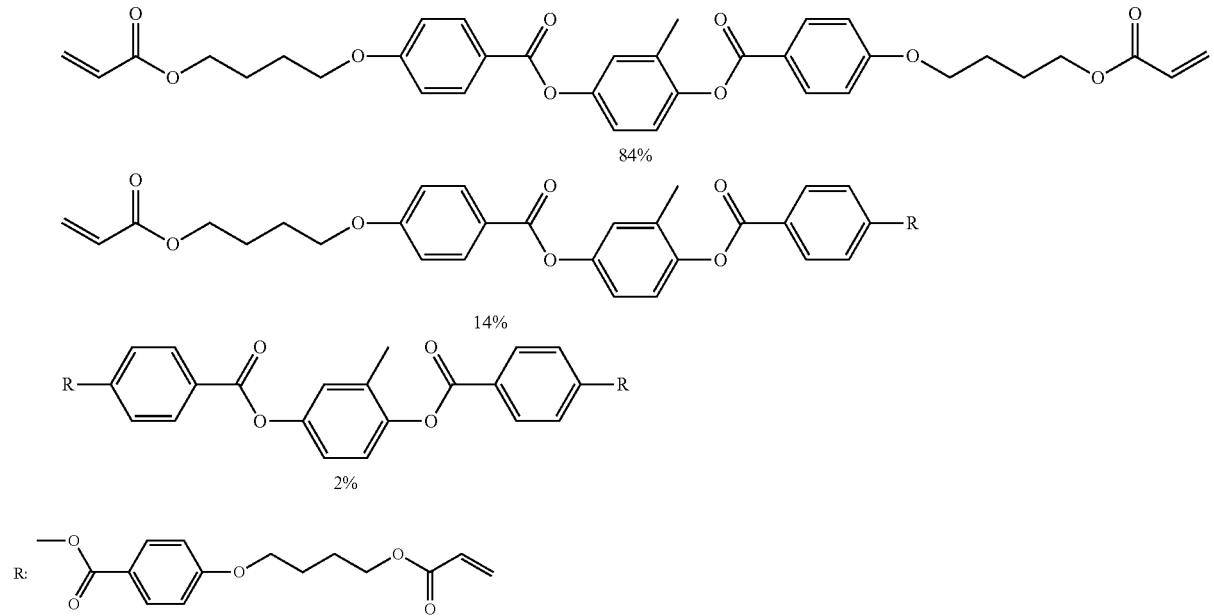

The numerical values are expressed in % by mass. R represents a group that is bonded to oxygen.

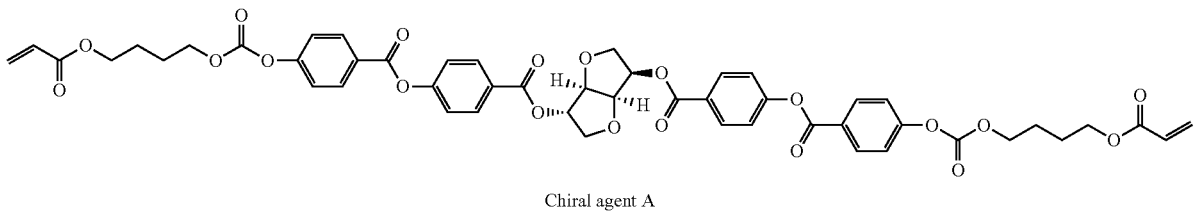

Chiral agent A

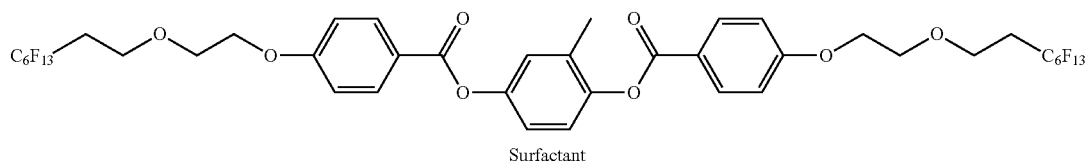

Surfactant

<<Formation of Blue Cholesteric Liquid Crystal Layer>>

The cholesteric liquid crystal solution 1 prepared above jetted to the inclined surface of the protruding portion of the prepared support with an ink jet printer (DMP-2831, manufactured by Fujifilm Dimatix, Inc.) while adjusting an amount of solution so that the thickness became 2.8 μm. After drying at 95° C. for 30 seconds, irradiation of ultraviolet rays of 500 mJ/cm$^2$ was performed by an ultraviolet irradiation device, and therefore a blue cholesteric liquid crystal layer was formed on the inclined surface. This was used as an optical member 01.

<<Formation of Green Cholesteric Liquid Crystal Layer>>

A cholesteric liquid crystal solution 2 was prepared in the same manner as the cholesteric liquid crystal solution 1 except that 5.1 parts by mass of the amount of addition of the chiral agent jetted while adjusting an amount of solution so that the thickness became 3.5 μm.

An optical member 02 having a green cholesteric liquid crystal layer on the inclined surface of the protruding portion was produced in the same manner as in the production of the optical member 01 except that the cholesteric liquid crystal solution 2 above was used.

<<Formation of Red Cholesteric Liquid Crystal Layer>>

A cholesteric liquid crystal solution 3 was prepared in the same manner as the cholesteric liquid crystal solution 1 except that 4.4 parts by mass of the amount of addition of the chiral agent jetted while adjusting an amount of solution so that the thickness became 4.0 μm.

An optical member 03 having a red cholesteric liquid crystal layer on the inclined surface of the protruding portion was produced in the same manner as in the production of the optical member 01 except that the cholesteric liquid crystal solution 3 above was used.

<<Formation of Overcoat>>

A composition as described below was stirred and dissolved in a vessel that had been kept warm at 25° C., and thus an overcoat layer application solution was prepared.

(Overcoat Application Solution)

| | |
|---|---|
| Acetone | 100 parts by mass |
| KAYARAD DPCA-30 | 30 parts by mass |
| (manufactured by Nippon Kayaku Co., Ltd.) | |
| EA-200 | 70 parts by mass |
| (manufactured by Osaka Gas Chemicals Co., Ltd.) | |
| IRGACURE 819 (manufactured by BASF SE) | 3 parts by mass |

An overcoat application solution 1 thus prepared was applied onto each of the cholesteric liquid crystal layers of the optical member 01, the optical member 02, and the optical member 03 which were subjected to embossing, by using #15 bar coater.

Next, the optical member 01, the optical member 02, and the optical member 03 to which the overcoat application solution 1 was applied were laminated in the thickness direction. Thereafter, heating was performed so that a film surface temperature became 50° C., and after drying for 60 seconds, irradiation with ultraviolet rays of 500 mJ/cm$^2$ was performed using an ultraviolet irradiation device so as proceed a crosslinking reaction. Therefore, an overcoat layer was formed and the optical member 01, the optical member 02, and the optical member 03 were adhered, and thus a transparent screen 100a was prepared.

A spiral axis angle $\theta_1$ of each of the cholesteric liquid crystal layers was 10°.

In addition, a difference in refractive index between the cholesteric liquid crystal layer and the protruding portion was 0.08, and a difference in refractive index between the cholesteric liquid crystal layer and the overcoat layer was 0.02.

Examples 2 to 4

The transparent screen 100a was produced in the same manner as in Example 1 except that the inclination angles of the inclined surfaces of the protruding portions were set to 15°, 20°, and 25°, respectively, and the counts of the bars were set to #20, #28, and #35, respectively, that is, the spiral axis angles $\theta_1$ were changed so as to be set to 15°, 20°, and 25°.

Example 5

The transparent screen 10f as shown in FIG. 7 was produced in the same manner as in Example 2 except that the cholesteric liquid crystal layer of the three-layered configuration reflecting light in different wavelength regions was used.

Specifically, by using the cholesteric liquid crystal solution 1, the cholesteric liquid crystal solution 2, and the cholesteric liquid crystal solution 3, the cholesteric liquid crystal layer of the three-layered configuration was formed so as to have the laminate in the order shown in FIG. 7, and therefore the transparent screen 10f was produced.

Example 6

Figure 9:
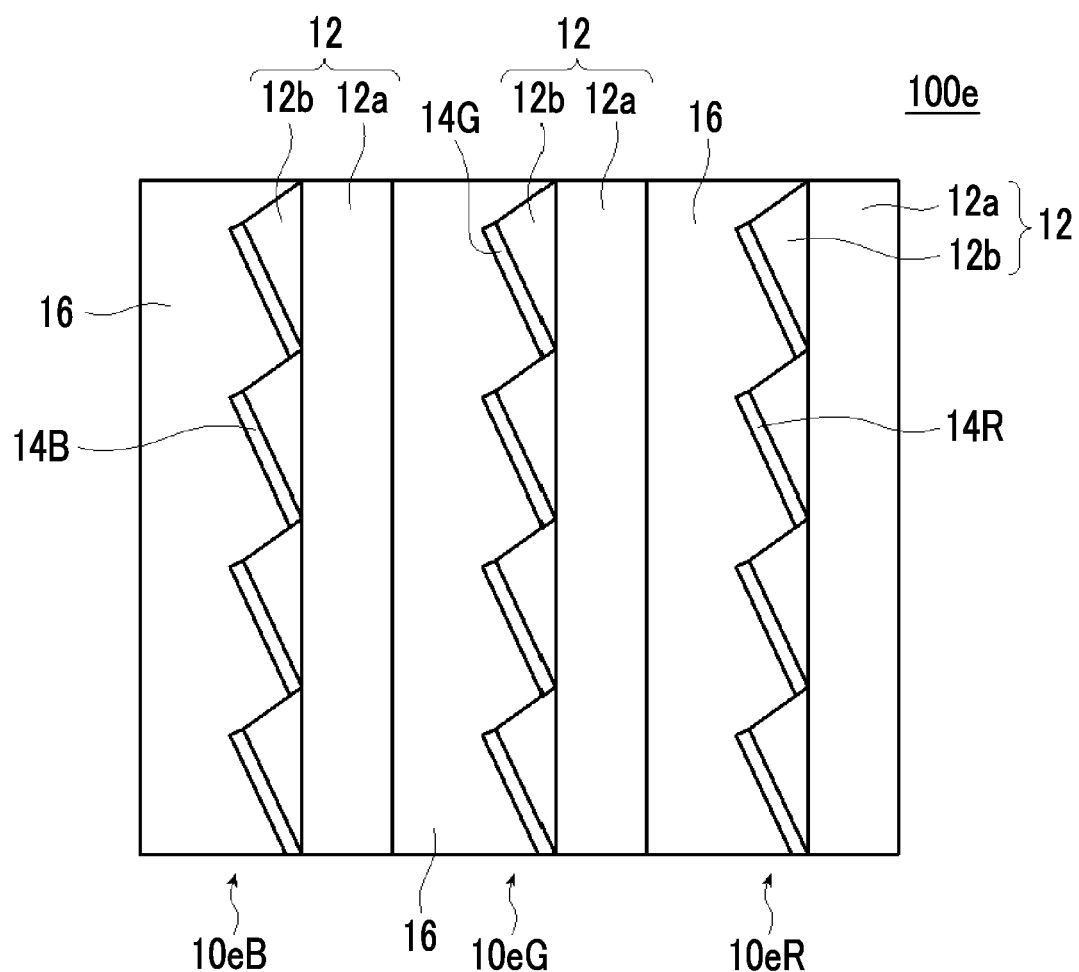
FIG. 9 is a diagram conceptually showing still another example of the transparent screen of the present invention.

A transparent screen 100e having three layers of the transparent screen unit 10 eR, the transparent screen unit 10 eG, and the transparent screen unit 10 eB as shown in FIG. 9 was produced in the same manner as in Example 2 except that the cross-sectional shape of the protruding portion was an obtuse-angled triangle shape and the obtuse angle was 110°.

Example 7

A transparent screen having three layers were produced in the same manner as in Example 2 except that a configuration in which a gap of 92 μm was provided between adjacent protruding portions was adopted.

Example 8

The transparent screen 100a was produced in the same manner as in Example 1 except that an ink jet printer JV400SUV (manufactured by MIMAKI ENGINEERING CO., LTD.) was used in a case where the cholesteric liquid crystal solution jetted.

A structure of JV400SUV will be described.

JV400SUV is a shuttle scan-type solvent UV printer, and has a configuration in which a preheater, a print heater, a post heater are provided as a heating system and a hot-cathode tube is provided as a curing light source at the most downstream.

The preheater is a heater that warms the substrate before printing, the print heater is a heater that warms the substrate at the time of printing, and the post heater performs heating after printing and is a heater that volatilizes an organic solvent from a landed ink and promotes the alignment of the liquid crystal compound. The solvent in the ink is volatilized before curing and is cured by the hot-cathode tube in a state where the solvent is removed.

The printing conditions were set to 24 pass bidirectional mode, the preheater, the print heater, and the post heater were each set at 60° C.

Comparative Example 1

A transparent screen was produced in the same manner as in Example 2 except that a metal layer was formed instead of the cholesteric liquid crystal layer.

A mirror was disposed at the position of the transparent screen, and with the brightness of regular reflection light in a case where the LUMINANCE COLORIMETER was disposed at a position of regular reflection with respect to the projector being set to 100, the reflectance was calculated.

In addition, a transmittance and a haze value were measured using haze meter NDH-2000 (manufactured by NIPPON DENSHOKU INDUSTRIES Co., Ltd.).

The result is shown in Table 1.

In Table 1, the overcoat layer is represented as an OC layer.

TABLE 1

| | | Cholesteric liquid crystal layer | | | | Evaluation | | |
|---|---|---|---|---|---|---|---|---|
| | Unit configuration | Layer configuration | Spiral axis angle $\theta_1$ (°) | Refractive index difference between protruding portion | Refractive index difference between OC layer | Shape of protruding portion | Reflectance % | Transmittance % | Haze % |
| Example 1 | Three-layered | One-layered | 10 | 0.08 | 0.02 | Right-angled triangle | 26 | 48 | 8 |
| Example 2 | Three-layered | One-layered | 15 | 0.08 | 0.02 | Right-angled triangle | 31 | 48 | 8 |
| Example 3 | Three-layered | One-layered | 20 | 0.08 | 0.02 | Right-angled triangle | 31 | 48 | 8 |
| Example 4 | Three-layered | One-layered | 25 | 0.08 | 0.02 | Right-angled triangle | 26 | 48 | 8 |
| Example 5 | One-layered | Three-layered | 15 | 0.08 | 0.02 | Right-angled triangle | 31 | 48 | 7 |
| Example 6 | Three-layered | One-layered | 15 | 0.08 | 0.02 | Obtuse-angled triangle (obtuse angle of 110°) | 40 | 59 | 8 |
| Example 7 | Three-layered | One-layered | 15 | 0.08 | 0.02 | Right-angled triangle (with 92 μm gap) | 40 | 59 | 8 |
| Example 8 | Three-layered | One-layered | 10 | 0.08 | 0.02 | Right-angled triangle | 26 | 48 | 8 |
| Comparative Example 1 | Three-layered | Metal layer | 15 | 1.4 | 1.5 | Right-angled triangle | 30 | 30 | 25 |
| Comparative Example 2 | Three-layered | One-layered | 2 | 0.08 | 0.02 | Right-angled triangle | 9 | 48 | 8 |
| Comparative Example 3 | Three-layered | One-layered | 50 | 0.08 | 0.02 | Right-angled triangle | 3 | 48 | 8 |

In the metal layer, Ag was vapor-deposited on the support by a vapor sputtering method. At this time, the film thickness was adjusted so that the transmittance became 30%.

Comparative Examples 2 and 3

A transparent screen was produced in the same manner as in Example 1 except that the inclination angles of the inclined surfaces of the protruding portions were set to 2° and 50°, respectively, that is, the spiral axis angles $\theta_1$ were set to 2° and 50°, respectively.

[Evaluation]

<Reflectance>

By using projector EH-TW410 (manufactured by Seiko Epson Corp.), a white image was projected on each of the transparent screen from 60° degrees, the brightness from the normal direction of the transparent screen (that is, the front direction) was measured with LUMINANCE COLORIMETER BM-5 (manufactured by TOPCON CORPORATION), and therefore the reflectance was calculated.

As shown in Table 1, in Examples 1 to 7 of the present invention in which the spiral axis angles were 5° to 42°, and a difference in refractive index between the protruding portion and the cholesteric liquid crystal layer and, the overcoat layer and the cholesteric liquid crystal layer was 0.2 or less, the reflectance from the front was high, the transmittance was high, and the haze value was small, compared to those of Comparative Examples 1 to 3.

In addition, based on the comparison between Examples 1 to 4, it is understood that the spiral axis angles of 15° to 20° are more preferable.

In addition, based on the comparison between Example 2 and Examples 6 and 7, by setting the cross-sectional shape of the protruding portion to the obtuse-angled triangle, or by disposing the gap between the protruding portions, it was found that the reflectance and the transmission became higher, which is preferable.

Based on the above results, the effect of the present invention became clear.

EXPLANATION OF REFERENCES 10, 10a to 10f: transparent screen
12, 32, 34: support
12a: substrate
12b, 32b: protruding portion
14: cholesteric liquid crystal layer
14R: red cholesteric liquid crystal layer
14G: green cholesteric liquid crystal layer
14B: blue cholesteric liquid crystal layer
14T: three-layered cholesteric liquid crystal layer
15R: red region
15G: green region
15B: blue region
16: overcoat layer
32a: substrate portion
34b: protruding portion layer
$\theta_1$: spiral axis angle
$\theta_2$: obtuse angle

What is claimed is:

1. A transparent screen comprising:
a support that is capable of transmitting light;
a plurality of protruding portions that are formed on one surface of the support and have inclined surfaces parallel to each other;
a cholesteric liquid crystal layer that is formed on each of the inclined surfaces of the plurality of protruding portions and formed of a liquid crystal material having a cholesteric structure; and
an overcoat layer that is laminated on the surface of the support, on which the plurality of protruding portions are formed, so as to cover the cholesteric liquid crystal layer,
wherein in a cross section perpendicular to the surface of the overcoat layer and parallel to an inclination direction of the inclined surface of the plurality of protruding portions, a shape of the protruding portion is an obtuse-angled triangle, and an apex of the obtuse angle is spaced from the surface of the support,
the protruding portions adjacent to each other in the inclination direction of the inclined surfaces of the protruding portions are disposed in contact with each other,
a normal line of each of the inclined surfaces of the plurality of protruding portions is parallel to a spiral axis of the cholesteric structure of the cholesteric liquid crystal layer,
an angle formed between a normal line of a surface of the overcoat layer and the spiral axis of the cholesteric structure of the cholesteric liquid crystal layer is 5° to 42°,
a difference in refractive index between the cholesteric liquid crystal layer and the protruding portion is 0.2 or less, and
a difference in refractive index between the cholesteric liquid crystal layer and the overcoat layer is 0.2 or less.

2. The transparent screen according to claim 1,
wherein an angle of the spiral axis of the cholesteric structure of the cholesteric liquid crystal layer with respect to the surface of the overcoat layer is 15° to 25°.

3. The transparent screen according to claim 1,
wherein the difference in refractive index between the cholesteric liquid crystal layer and the protruding portion is 0.05 or less, and
the difference in refractive index between the cholesteric liquid crystal layer and the overcoat layer is 0.05 or less.

4. The transparent screen according to claim 2,
wherein the difference in refractive index between the cholesteric liquid crystal layer and the protruding portion is 0.05 or less, and
the difference in refractive index between the cholesteric liquid crystal layer and the overcoat layer is 0.05 or less.

5. The transparent screen according to claim 1,
wherein the cholesteric liquid crystal layer is formed of two or more layers reflecting light of different wavelength regions.

6. The transparent screen according to claim 4,
wherein the cholesteric liquid crystal layer is formed of two or more layers reflecting light of different wavelength regions.

7. A transparent screen that is formed by laminating two or more of the transparent screens according to claim 1,
wherein cholesteric liquid crystal layers of the respective transparent screens reflect light of different wavelength regions.

8. A transparent screen that is formed by laminating two or more of the transparent screens according to claim 6,
wherein cholesteric liquid crystal layers of the respective transparent screens reflect light of different wavelength regions.

* * * * *